*US007569969B2*

(12) United States Patent
Nakano et al.

(10) Patent No.: US 7,569,969 B2
(45) Date of Patent: Aug. 4, 2009

(54) ARMATURE, ROTATING ELECTRIC MACHINE, DC MOTOR, AND BRUSHLESS MOTOR

(75) Inventors: Yoshiki Nakano, Hamamatsu (JP); Akihiko Seki, Aichi-ken (JP); Yoshitaka Tao, Toyohashi (JP); Ryohei Kageyama, Hamamatsu (JP); Kazushi Sugishima, Hamamatsu (JP); Yasuhide Ito, Hamamatsu (JP); Masayuki Kuwano, Kosai (JP); Toshio Yamamoto, Kosai (JP); Kazuyuki Izumi, Iwata (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 46 days.

(21) Appl. No.: 11/664,449

(22) PCT Filed: Aug. 2, 2006

(86) PCT No.: PCT/JP2006/315265

§ 371 (c)(1),
(2), (4) Date: Apr. 2, 2007

(87) PCT Pub. No.: WO2007/015499

PCT Pub. Date: Feb. 8, 2007

(65) Prior Publication Data

US 2007/0257572 A1     Nov. 8, 2007

(30) Foreign Application Priority Data

| Aug. 3, 2005 | (JP) | .............................. 2005-225728 |
| Aug. 3, 2005 | (JP) | .............................. 2005-225729 |
| Aug. 3, 2005 | (JP) | .............................. 2005-225730 |
| Feb. 24, 2006 | (JP) | .............................. 2006-048933 |

(51) Int. Cl.
*H02K 1/22* (2006.01)
(52) U.S. Cl. ...................................................... 310/264
(58) Field of Classification Search ................. 310/234, 310/236, 195, 264, 261
See application file for complete search history.

(56) References Cited

U.S. PATENT DOCUMENTS

| 6,563,248 | B2 * | 5/2003 | Fujita ......................... 310/181 |
| 2002/0121831 | A1 * | 9/2002 | Egawa et al. ................. 310/216 |
| 2003/0189385 | A1 * | 10/2003 | Fujita ......................... 310/181 |
| 2004/0095036 | A1 * | 5/2004 | Yamamoto et al. ........... 310/233 |
| 2005/0206264 | A1 |  9/2005 | Yamamoto et al. |

FOREIGN PATENT DOCUMENTS

| JP | 11-356024 | 12/1999 |
| JP | 2000-175396 | 6/2000 |
| JP | 2003-299292 | 10/2003 |
| JP | 2004-88902 | 3/2004 |
| JP | 2005-137193 | 5/2005 |
| JP | 2006-67774 | 3/2006 |

* cited by examiner

*Primary Examiner*—Javaid Nasri
(74) *Attorney, Agent, or Firm*—Patterson, Thuente, Skaar & Christensen, P.A.

(57) ABSTRACT

An insulator is mounted in an armature core. Coils are wound around teeth of the armature core by way of concentrated winding. A power feeding member, which supplies a current to the coils, includes a connecting portion. A separating portion, which is provided in the insulator, is located in the teeth. The separating portion separates each of the coils to a first portion and a second portion. The connecting portion is electrically connected to the first portion. Accordingly, while preventing damage to the coils, the coils are easily connected to the power feeding member.

32 Claims, 29 Drawing Sheets

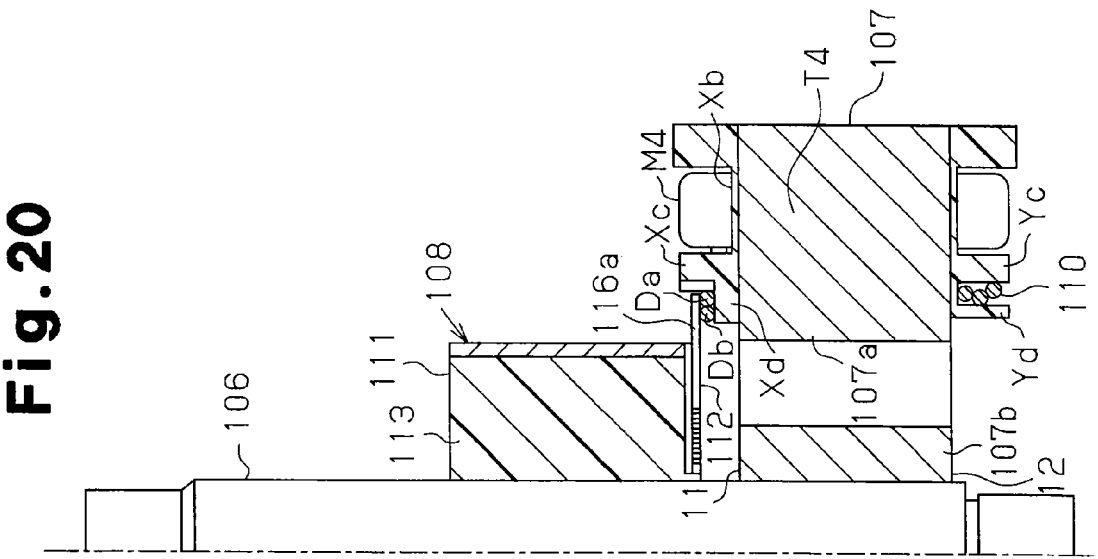
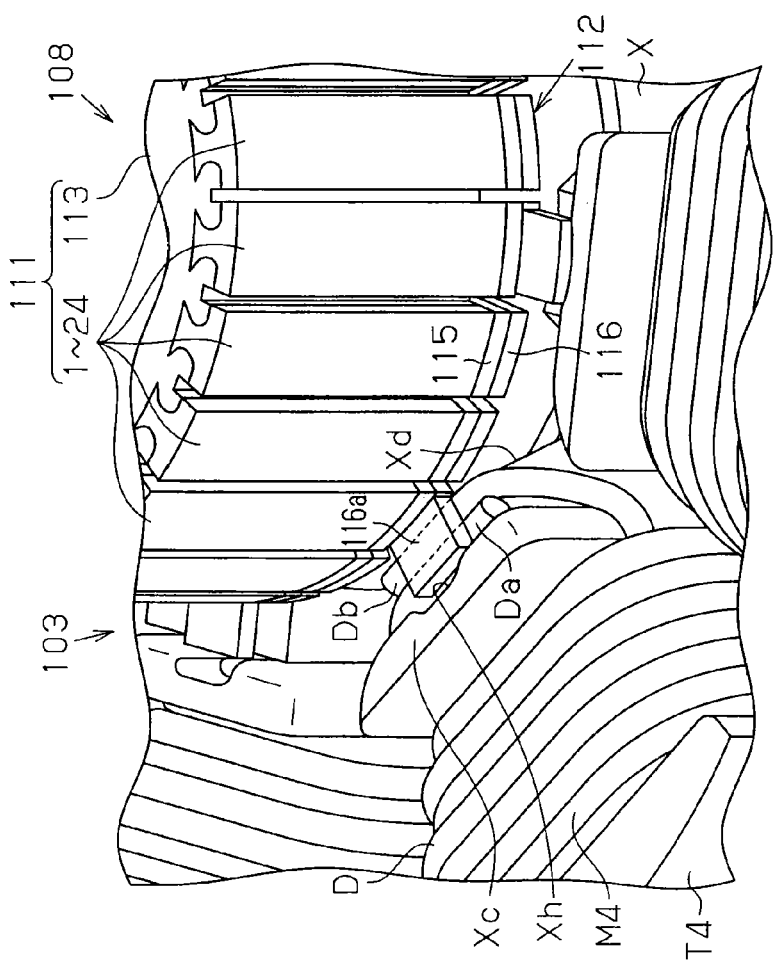

ARMATURE, ROTATING ELECTRIC MACHINE, DC MOTOR, AND BRUSHLESS MOTOR

RELATED APPLICATIONS

This application claims priority to PCT Application No. PCT/JP2006/315265 filed Aug. 2, 2006; Japanese Patent Application No. 2005-225728 filed on Aug. 3, 2005; Japanese Patent Application No. 2005-225729 filed Aug. 3, 2005; Japanese Patent Application No. 2005-225730 filed on Aug. 3, 2005; and Japanese Patent Application No. 2006-048933 filed on Feb. 24, 2006, the disclosures of which are hereby incorporated by reference in their entirety.

FIELD OF THE INVENTION

The present invention relates to an armature, a rotating electrical machine, a DC motor, and a brushless motor.

BACKGROUND ART

Conventionally, an armature of a DC motor includes a coil and a commutator, which is electrically connected to the coil. In a DC motor described in Patent Document 1, a coil is wound around an armature core. A free end, or an end of a conductor, extends from the coil. The free end is connected to a connecting portion provided in a segment of the commutator.

However, in the DC motor, a step of connecting the free end, or the end of the conductor extending from the coil to the connecting portion of the commutator, is an separate and independent step from a step of winding the coil around the armature core. In other words, connection of the conductor to the connecting portion of the commutator is complicated.

The end of the conductor is connected to the connecting portion of the commutator through, for example, welding at a position on the coil, or a position at which the coil is provided as viewed in the axial direction. Therefore, such connection is hampered by the coil, causing damage to the coil, or a short circuit.

These problems happen not only in motors having brushes and a commutator. Patent Document 2 discloses a brushless motor in which a circuit device, not a commutator, is connected to a portion of a conductor. Specifically, a portion of the conductor, which forms a coil and a connecting wire, is electrically connected to a terminal assembled with a stator core. The terminal is electrically connected to a connecting portion provided in the circuit device, which supplies a drive current to the coil.

However, since the brushless motor includes the terminal, the number of the components of the motor increases. Further, manufacture of the brushless motor involves a step of assembling the terminal with the stator core and a step of electrically connecting the conductor to the terminal, which is, for example, a step of pressing the conductor against the terminal and fusing the conductor to the terminal. These steps complicate the manufacture of the motor.

As another typical example, there is a case in which a coil is wound around a plurality of teeth extending radially from an armature core by way of concentrated winding. Patent Document 3 discloses a radial connecting member that connects an armature core having radial teeth to a rotary shaft. A coil is wound around the armature core by way of concentrated winding, making it easy for the armature core to generate heat. However, since the connecting portion has a hollow portion, or a clearance, the armature core exhibits improved heat radiating performance.

Nonetheless, by providing the connecting member in the armature core, the number of the components of the armature core increases. Further, since the coil is wound around the armature core by way of concentrated winding, the lamination factor of the coil becomes great, decreasing the size of the clearance. The armature core thus easily generates heat, making it desirable to improve the head radiating performance of the armature core.

Patent Document 1: Japanese Laid-Open Patent Publication No. 2003-299292

Patent Document 2: Japanese Laid-Open Patent Publication No. 11-356024

Patent Document 3: Japanese Laid-Open Patent Publication No. 2004-88902

SUMMARY OF THE INVENTION

It is an objective of the present invention to provide an armature, a rotating electrical machine, a DC motor, and a brushless motor that facilitate connection of a coil to a power feeding member while preventing damage to the coil.

It is another objective of the present invention to provide an armature and a DC motor that facilitate electrical connection process of coils to a commutator while preventing damage to connecting wires that connect the coils together.

It is another objective of the invention to provide a brushless motor that includes a less number of components and is manufactured by a simple procedure.

It is another objective of the invention to provide a rotating electrical machine and an armature core that exhibit improved heat radiating performance while suppressing increase of the number of the components.

In accordance with one aspect of the present invention, an armature including an armature core that has radial teeth is provided. The armature has an insulator mounted in the armature core. A conductor includes coils that extend continuously. Each coil is wound around one of the teeth of the armature core by way of concentrated winding with the insulator mounted in the armature core. A power feeding member supplies a current from a power source to the coils. The power feeding member has a connecting portion. A separating portion, which is provided in the insulator, is arranged in the teeth. The separating portions separates each of the coils into a first portion and a second portion. The connecting portion is electrically connected to the first portion.

In accordance with another aspect of the present invention, an armature including an armature core that has radial teeth is provided. The armature core has a first end and a second end arranged at an opposing side as viewed in an axial direction. A conductor includes coils and a connecting wire that interconnects the coils. Each coil is wound about the corresponding one of the teeth by way of concentrated winding. A power feeding member is arranged at a side corresponding to the first end. The coils are electrically connected to the power feeding member at the side corresponding to the first end. The connecting wire is arranged at a side corresponding to the second end.

BRIEF DESCRIPTION OF THE DRAWINGS

FIG. 19 is an enlarged perspective view showing a connecting portion and a conductor of FIG. 17;

FIG. 20 is a vertical cross-sectional view showing an armature of FIG. 17;

DETAILED DESCRIPTION OF THE PREFERRED EMBODIMENTS

A first embodiment of the present invention will now be described with reference to FIGS. 1 to 10.

Figure 1:
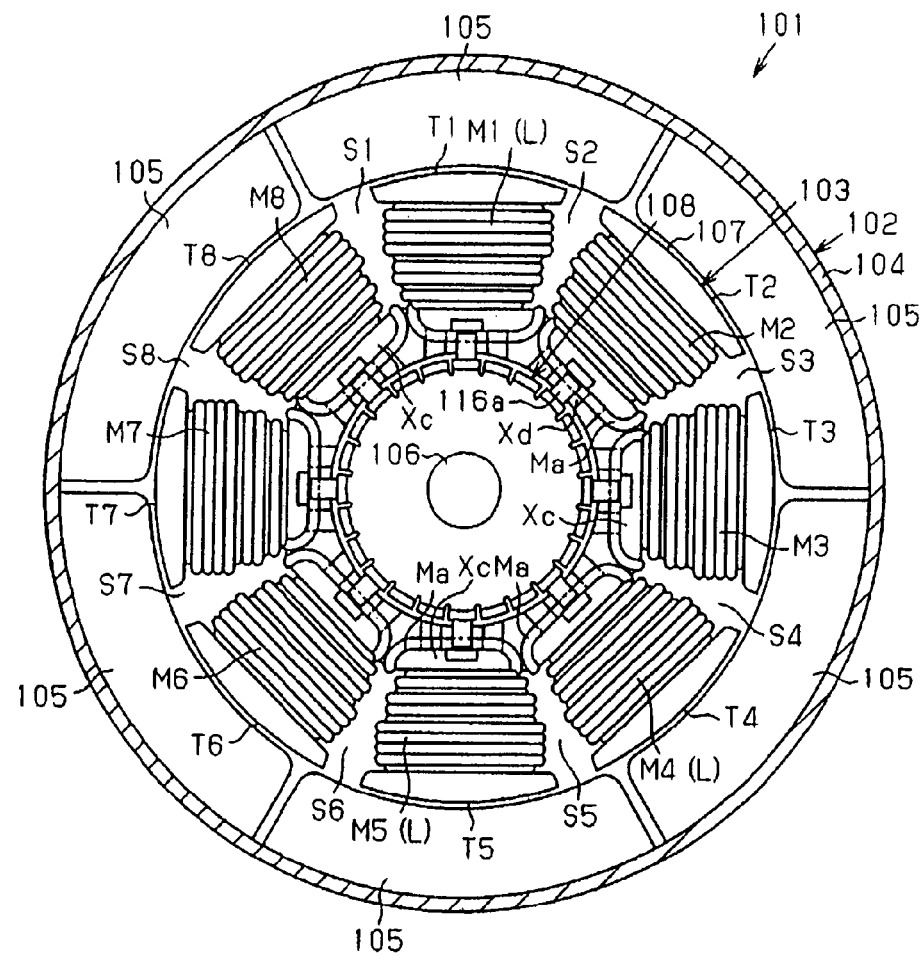
FIG. 1 is a horizontal cross-sectional view showing a motor according to a first embodiment of the present invention.

As shown in FIG. 1, a DC motor 101, or a rotating electrical machine, includes a stator 102 and an armature 103, which is a rotor. The stator 102 has a substantially cylindrical yoke housing 104 and a plurality of magnets 105, which are secured to the inner peripheral surface of the yoke housing 104 and spaced at equal angular intervals. In the first embodiment, a total of six magnets 105 are provided, forming six poles, or six magnetic poles.

Figure 2:
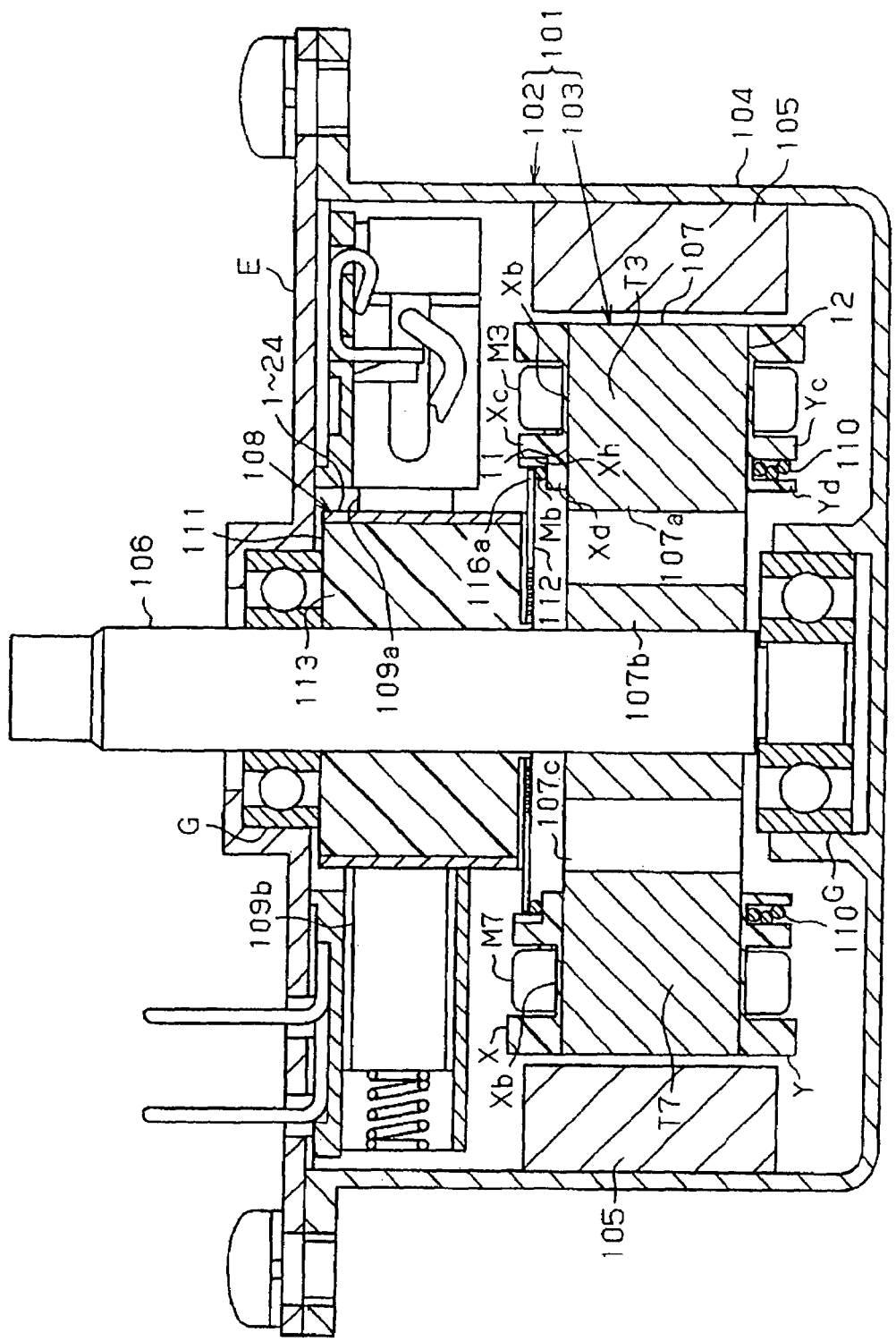
FIG. 2 is a vertical cross-sectional view showing the motor of FIG. 1.

Referring to FIGS. 1 and 2, the armature 103 includes a rotary shaft 106, armature core 107, and a commutator 108. The armature core 107 and the commutator 108 are secured to the rotary shaft 106. As shown in FIG. 2, the opposing ends of the rotary shaft 106 are rotatably supported by a pair of bearings G. One of the bearings G is held by the yoke housing 104 and the other is held by an end housing E, which closes the opening of the yoke housing 104. An anode brush 109a and a cathode brush 109b are supported by the end brush E to supply power. The brushes 109a, 109b are pressed against and thus slidably held in contact with the outer circumference of the commutator 108. The magnets 105 oppose the armature core 107 and thus encompass the armature core 107.

Figure 4A:
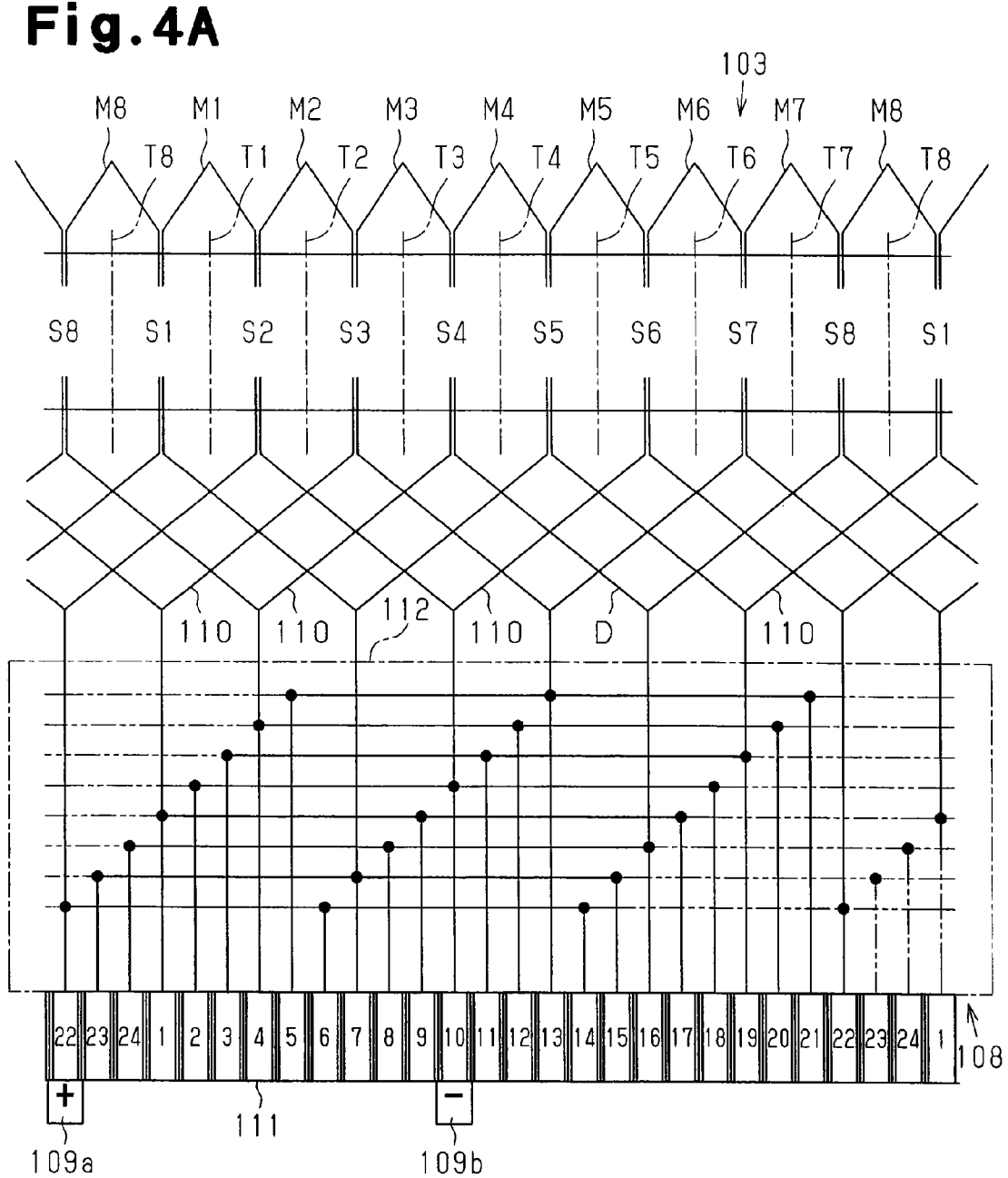
FIG. 4A is a diagram showing electric paths in an armature in a flatly developed state.

As shown in FIGS. 1 and 4A, the armature core 107 includes eight teeth T1 to T8, which are arranged around the rotary shaft 106 and project radially. Slots S1 to S8 are each defined between a corresponding adjacent pair of the teeth T1 to T8.

Figure 5:
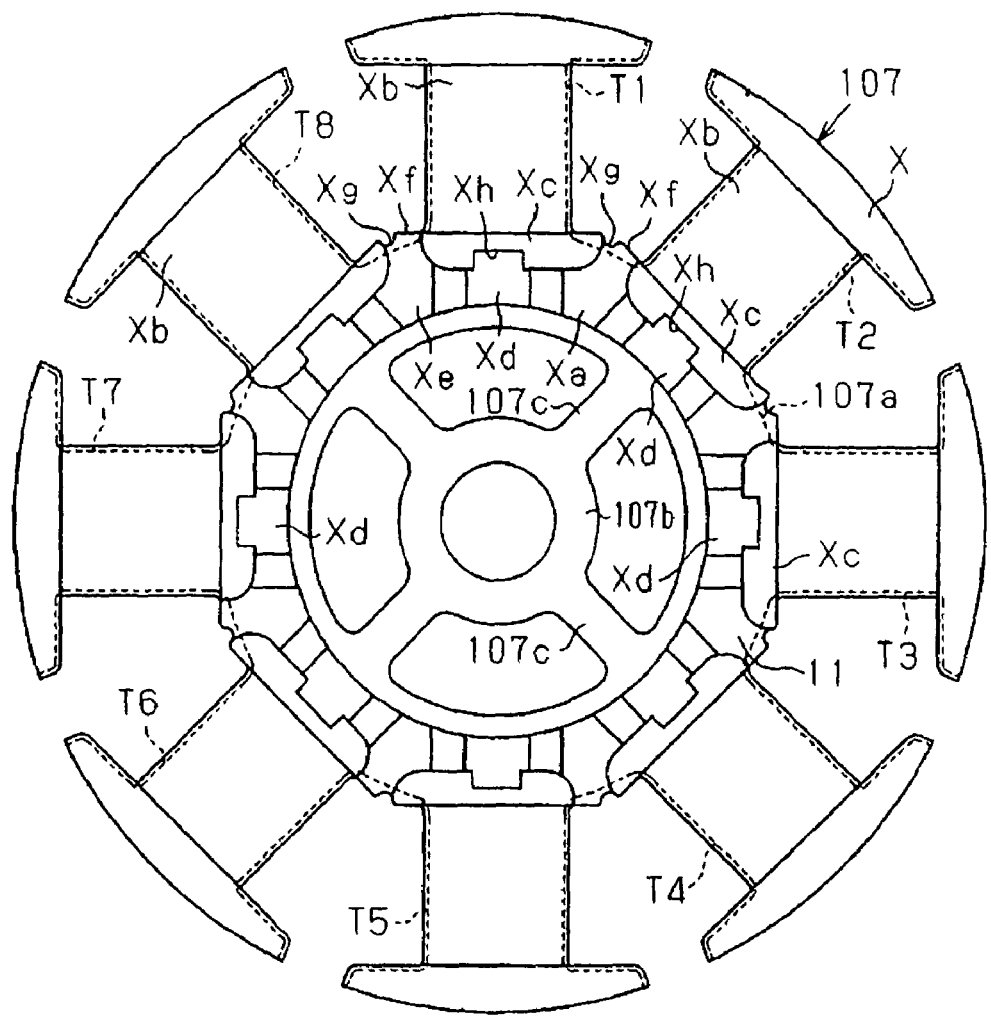
FIG. 5 is a plan view showing a first insulator of the armature core of FIG. 2.

Referring to FIG. 5, the armature core 107 has a plurality of circumferential connecting portions 107a, a fixing portion 107b, and a plurality of radial connecting portions 107c. Each of the circumferential connecting portions 107a circumferentially connects the proximal ends of the corresponding adjacent pair of the teeth T1 to T8. The fixing portion 107b has an annular shape and thus receives the rotary shaft 106. The radial connecting portions 107c are spaced at 90 degrees, each extending radially to connect the corresponding circumferential connecting portions 107a to the fixing portion 107b.

Referring to FIG. 2, the commutator 108 is arranged closer to the end housing E than the armature core 107, or located axially upward from the armature core 107. The armature core 107 has a first end 11 adjacent to the commutator 108 and a second end 12 opposed to the first end 11. A first insulator X is secured to the first end 11, as viewed at an upper side in FIG. 2. A second insulator Y is secured to the second end 12, as viewed at a lower side in the drawing.

As shown in FIG. 5, the first insulator X has an annular cover portion Xa, a plurality of tooth cover portions Xb, a plurality of separating portions Xc, and a plurality of mounting projections Xd. The annular cover portion Xa covers the circumferential connecting portions 107a of the armature core 107. Each of the tooth cover portions Xb covers the corresponding one of the teeth T1 to T8. The separating portions Xc are arranged in correspondence with the proximal ends of the teeth T1 to T8. Each of the mounting projections Xd, which serve as mounting portions, is arranged on the annular cover portion Xa. In other words, the mounting projections Xd are located radially inward with respect to the separating portions Xc. The first insulator X is formed of resin. The annular cover portion Xa, the tooth cover portions Xb, the separating portions Xc, and the mounting projections Xd are formed as an integral body.

With reference to FIG. 5, the annular cover portion Xa includes an axial cover section Xe and a radial cover section Xf. The axial cover section Xe axially covers the circumferential connecting portions 107a of the armature core 107. The outer peripheral surface of the axial cover section Xe has a regular octagonal outline. The radial cover section Xf covers the portion of the outer peripheral surface of each circumferential connecting portion 107a corresponding to the space between the corresponding adjacent pair of the teeth T1 to T8 from a radial outer side. The radial cover section Xf is formed with angles corresponding to a regular octagon. The radial cover section Xf is formed in an angular shape as viewed in the axial direction, in such a manner that the portion between each circumferential adjacent pair of the teeth T1 to T8 projects radially outward with respect to the regular octagon. The radial cover section Xf has a plurality of groves Xg. Each of the grooves Xg is provided at a corresponding corner of the radial cover section Xf and extends axially. Each groove Xg faces radially inward and is recessed in a substantially arcuate shape.

Figure 7:
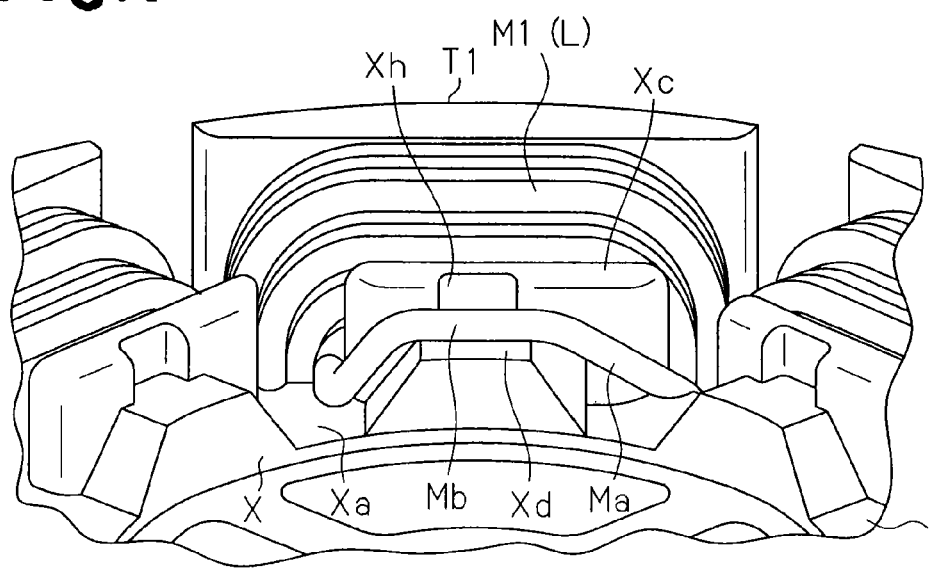
FIG. 7 is an enlarged perspective view showing a conductor mounted on a mounting portion of FIG. 1.

Referring to FIG. 2, each of the separating portions Xc axially projects with respect to the corresponding one of the tooth cover sections Xb. Each separating portion Xc is arranged at the proximal end of the corresponding tooth T1 to T8 in such a manner as to separate the associated tooth cover portion Xb from the mounting projection Xd. Each separating portion Xc has an opening Xh that faces radially inward. Each mounting projection Xd axially projects with respect to the associated tooth cover section Xb. The projection amount of each mounting projection Xd is smaller than the projection amount of each separating portion Xc. As shown in FIG. 7, each mounting projection Xd of the first embodiment has a substantially trapezoidal shape as viewed in a radial direction. The trapezoidal shape includes a longer side and a shorter side extending parallel with each other, with the shorter side corresponding to a distal end, or a top surface, of the mounting projection Xd.

Figure 6:
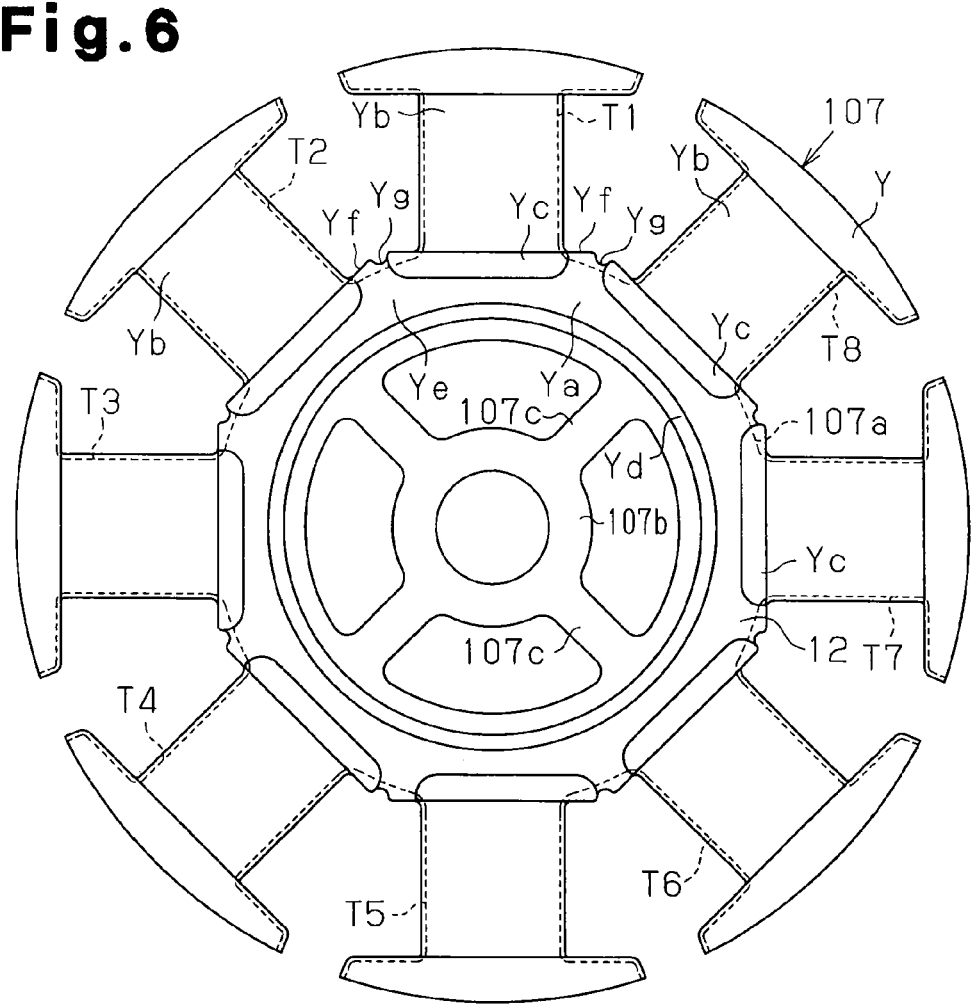
FIG. 6 is a plan view showing a second insulator of the armature core of FIG. 2.

As shown in FIG. 6, the second insulator Y includes an annular cover section Ya, a plurality of tooth cover sections Yb, a plurality of outer walls Yc, and an inner wall Yd. The annular cover section Ya and each of the tooth cover sections Yb are sized equally to the corresponding parts of the first insulator X. The annular cover section Ya covers the circumferential connecting portions 107a at the second end 12 of the armature core 107. Each of the tooth cover sections Yb covers the corresponding one of the teeth T1 to T8. The outer walls Yc are provided in a discontinuous manner on a common circle and in correspondence with the proximal ends of the teeth T1 to T8. Each of the outer walls Yc projects in the axial direction. The inner wall Yd has a substantially cylindrical shape and projects axially from the inner sides of the outer walls Yc, or the inner end of the annular cover section Ya. In the first embodiment, the outer walls Yc and the inner wall Yd form a guide portion. The second insulator Y is formed of resin. The annular cover section Ya, the tooth cover sections Yb, the outer walls Yc, and the inner wall Yd are formed as an integral body.

Like the first insulator X, the annular cover section Ya of the second insulator Y has an axial cover section Ye and a radial cover section Yf. The axial cover section Ye axially covers the circumferential connecting portions 107a of the armature core 107 at the second end 12. The radial cover section Yf covers the portion of the outer peripheral surface of each circumferential connecting portion 107a corresponding to the space between the corresponding adjacent pair of the teeth T1 to T8 at the second end and from a radial outer side. The radial cover section Yf is formed in an angular shape as viewed in the axial direction, in such a manner that the central portion between each circumferential adjacent pair of the teeth T1 to T8 projects radially most outward. A plurality of grooves Yg are defined at the corners of the radial cover section Yf. Each of the groove Yg faces radially outward and extends axially. The angle of each corner corresponds to an angle of a regular octagon. Each groove Yg is recessed in a substantially arcuate shape.

Figure 9:
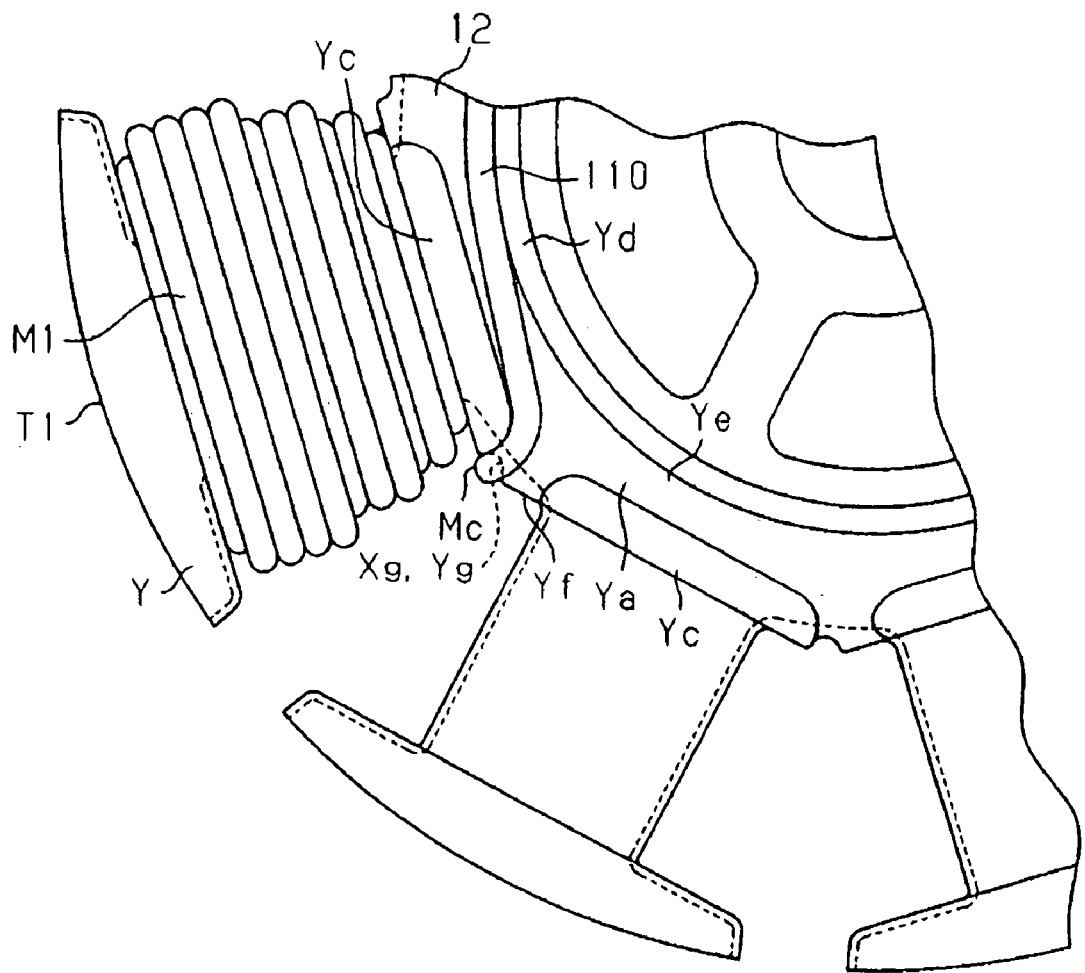
FIG. 9 is a bottom view showing the armature core with a connecting wire installed in the second insulator.
Figure 10:
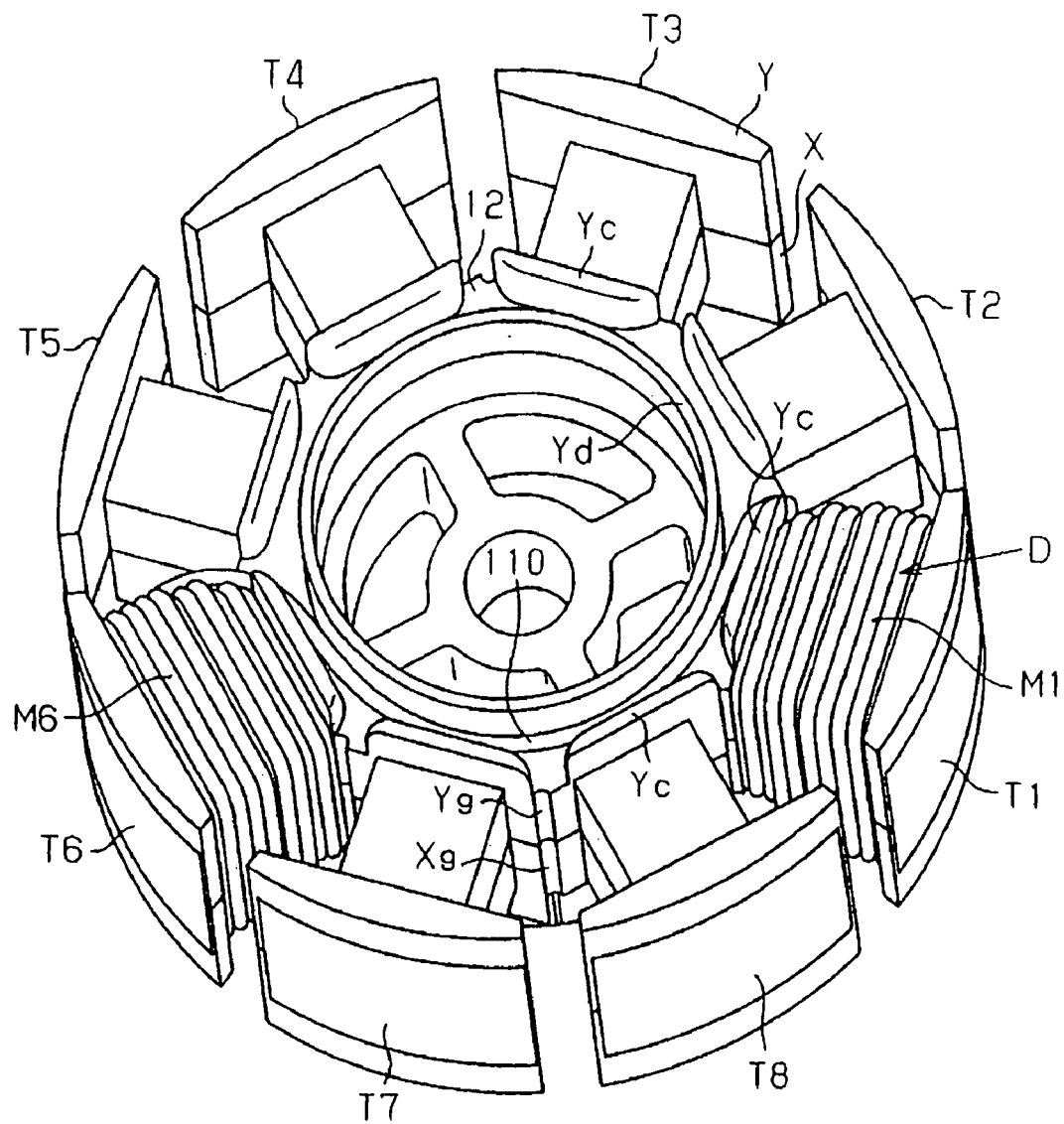
FIG. 10 is a bottom perspective view showing the armature core of FIG. 2 in a step of winding the coil around the armature core.

A conductor D is wound around the armature 103. The conductor D includes a plurality of coils M1 to M8 and a plurality of connecting wires provided continuously to the coils M1 to M8. Each of the coils M1 to M8 is wound around the corresponding one of the teeth T1 to T8 of the armature core 107 in which the first and second insulators X, Y are installed. Each coil M1 to M8 is wound by way of concentrated winding to pass through the corresponding slot S1 to S8. As shown in FIGS. 2, 9, and 10, the connecting wires 110 continuously connect the coils M1 to M8 together. FIG. 4A is a diagram showing electric paths of the armature 103 in a flatly developed state.

Each coil M1 to M8 is wound around the corresponding tooth T1 to T8 to extend along the entire length of the tooth T1 to T8. The coils M1 to M8 thus apply binding force to the corresponding teeth T1 to T8. Each of the connecting wires 110 straddles at least one of the teeth T1 to T8 in such a manner as to connect the corresponding two of the teeth T1 to T8. In this manner, each connecting wire 110 generates tensile force acting in a direction perpendicular to the axis of the armature 103.

As illustrated in FIG. 10, the conductor D of the first embodiment is first wound around the tooth T1 by way of concentrated winding, thus forming the coil M1. Subsequently, the conductor D is wound around the tooth T6 by way of concentrated winding while straddling the teeth T8, T7, thus forming the coil M6. The portion of the conductor D between the tooth T1 and the tooth T6 forms the corresponding one of the connecting wires 110. By repeatedly winding the conductor D in this manner, the coils M1 to M8 are formed. FIG. 10 shows a transitional state of such wiring of the conductor D.

As shown in FIGS. 1 and 7, each of the separating portions Xc separates a coil end Ma, or a first portion, of the corresponding one of the coils M1 to M8 from a second portion L of the coil M1 to M8. The coil end Ma of each coil M1 to M8 corresponds to a final turn of the winding. The second portion L of the coil M1 to M8 is wound around the corresponding tooth T1 to T8 at a position radially outward with respect to the associated separating portion Xc. Each separating portion Xc stops the second portion L of the corresponding coil M1 to M8 from moving radially inward. A conductor connecting portion Mb, which is a portion of each coil end Ma, is arranged on the corresponding mounting projection Xd.

The connecting wires 110 are provided while avoiding the positions on the corresponding mounting projections Kb. Referring to FIGS. 2, 9, and 10, each of the connecting wires 110 is arranged at the second end 12 of the armature core 107. In other words, each connecting wire 110 is opposed to the first end 11 of the armature core 107 adjacent to the commutator 108. The connecting wire 110 is guided by the guide portion, or the outer walls Yc and the inner wall Yd, to extend circumferentially and radially inward with respect to the teeth T1 to T8. More specifically, the outer walls Yc stop the corresponding connecting wires 110 from moving radially outward while the inner wall Yd stops the connecting wires 110 from moving radially inward.

As shown in FIG. 9, the conductor D includes a relay portion Mc that connects each of the conductor connecting portions Mb, which is located at the first end 11, to the corresponding connecting wire 110 at the second end 12. A substantially half portion of each relay portion Mc as viewed in a cross-sectional direction is received in the corresponding grooves Xg, Yg.

As shown in FIG. 2, the commutator 108 includes a commutator body 111 and a short circuit member 112, which is fixed to an axial end of the commutator body 111. The commutator body 111 has a substantially cylindrical body insulating material 113 and twenty-four segments 1 to 24, which are arranged on the outer circumferential surface of the body insulating material 113. The segments 1 to 24 are aligned circumferentially along the outer circumferential surface of the body insulating material 113 to form a substantially cylindrical shape. The brushes 109a, 109b are pressed against the segments 1 to 24 from radially outward and thus held in contact with the segments 1 to 24.

As illustrated in FIG. 4A, the short circuit member 112 electrically connects the segments 1 to 24 together at angular intervals of 120 degrees. In this manner, for example, the segments 1, 9, 17 are mutually short circuited in such a manner that the potentials of the segments 1, 9, 17 become equal. Similarly, the segments 5, 13, 21 are mutually short circuited by the short circuit member 112 in such a manner that the potentials of the segments 5, 13, 21 become equal.

Figure 3:
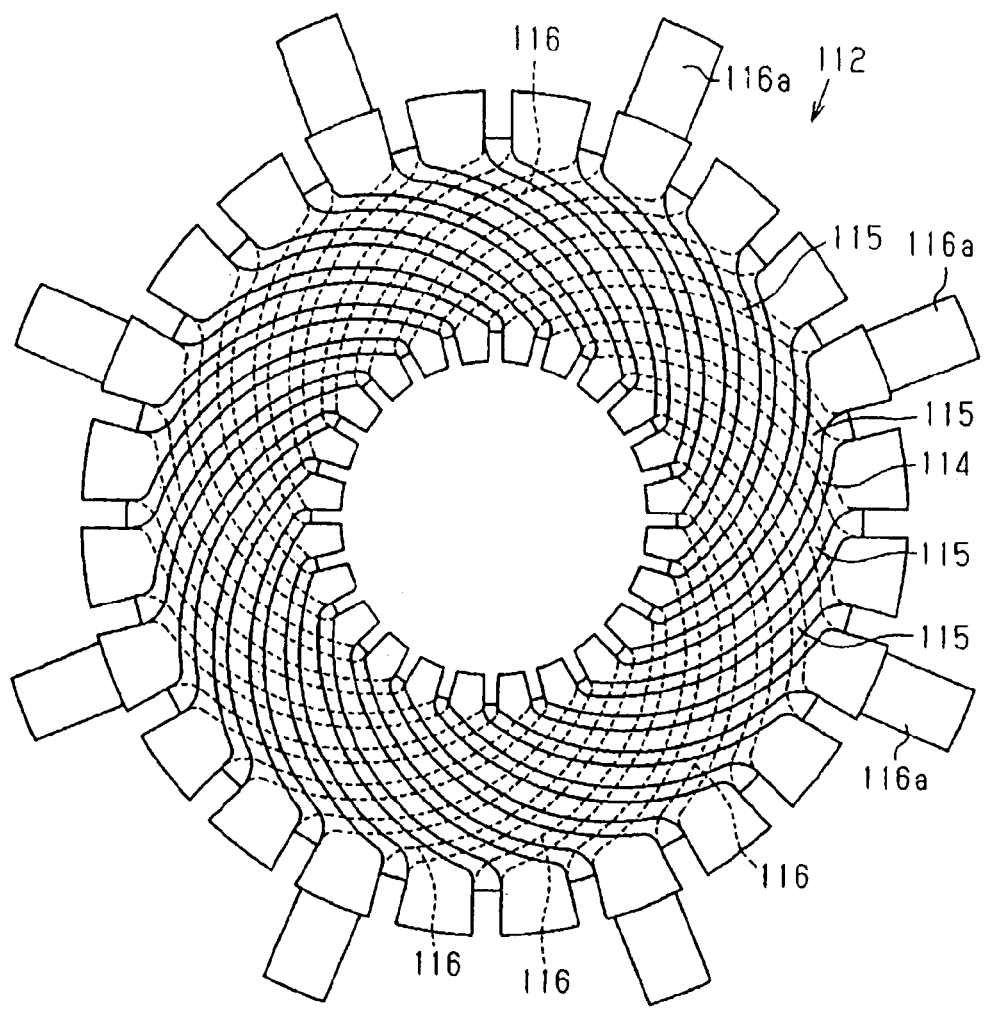
FIG. 3 is a plan view showing a short circuit member of FIG. 2.

As shown in FIG. 3, the short circuit member 112 includes an insulating layer 114 formed by a sheet of insulating paper, twenty-four first short circuit pieces 115, and 24 second short circuit pieces 116. The first and second short circuit pieces 115, 116 are provided at opposing sides of the insulating layer 114. In FIG. 3, the first short circuit pieces 115 are located closer to the viewer of the drawing than the second short circuit pieces 116. A radial inner end of each of the first short circuit pieces 115 is arranged 60 degrees offset from a radial outer end of the first short circuit piece in a clockwise direction of FIG. 3. The second short circuit pieces 116 are located farther from the viewer of the drawing than the first short circuit pieces 115, as indicated by the broken lines. A radial inner end of each of the second short circuit pieces 116 is arranged 60 degrees offset with respect to a radial outer end of the second short circuit piece 116 in a counterclockwise direction of FIG. 3.

The radial inner ends of the first short circuit pieces 115 are electrically connected to the radial inner ends of the corresponding second short circuit pieces 116 without being interfered by the insulating layer 114. The radial outer ends of the first short circuit pieces 115 are electrically connected to the radial outer ends of the corresponding second short circuit pieces 116 without being interfered by the insulating layer 114. In this manner, the radial outer ends of the first short circuit pieces 115 and the radial outer ends of the corresponding second short circuit pieces 116 are mutually spaced at angular intervals of 120 degrees, with the inner radial ends of the first short circuit pieces 115 and the inner radial ends of the second short circuit pieces 116 connected together. The radial outer ends of the short circuit member 112 are fixed to the commutator body 111 in such a manner that the radial outer ends of the short circuit member 112 are electrically connected to the corresponding segments 1 to 24.

Figure 8:
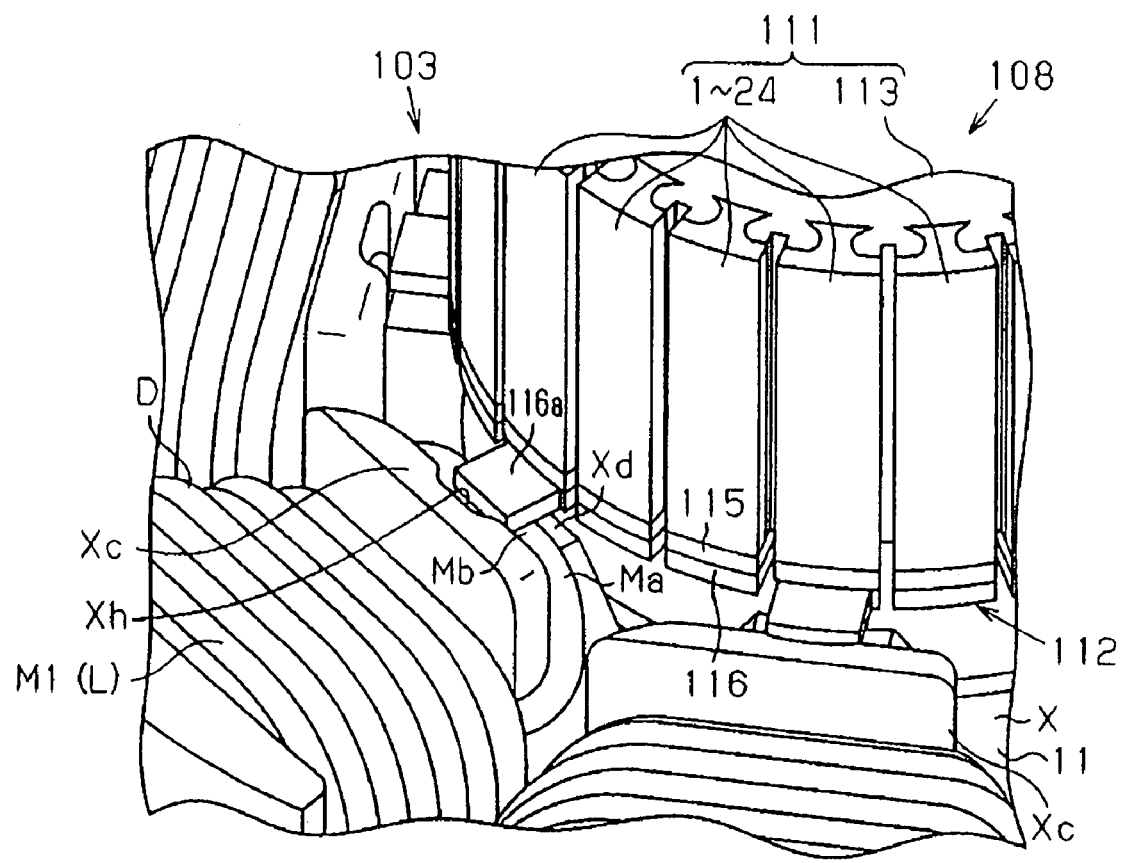
FIG. 8 is a perspective view showing the mounting portion and the conductor of FIG. 7 as viewed from a different angle.

As shown in FIG. 8, connecting portions 116a are formed at the radial outer ends of the second short circuit pieces 116. Each of the connecting portions 116a projects radially outward with respect to the segments 1 to 24. The connecting portions 116a are electrically connected to the corresponding conductor connecting portions Mb on the associated mounting projections Xd and fixed to the mounting projections Xd.

Referring to FIG. 8, each of the conductor connecting portions Mb and the corresponding one of the connecting portions 116a are mounted on the associated mounting projection Xd in this order in an axially overlapped manner. Specifically, each conductor connecting portion Mb is arranged between the corresponding connecting portion 116a and the associated mounting projection Xd. The connecting portions 116a are arranged at positions circumferentially corresponding to the openings Xh. As shown in FIG. 3, a total of eight connecting portions 116a are circumferentially arranged, one for every third one of the twenty-four short circuit pieces 116.

Figure 4B:
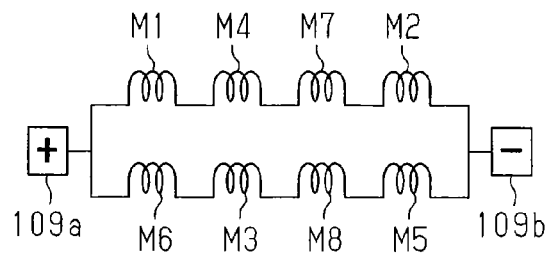
FIG. 4B is a diagram showing a circuit formed by the eight coils of FIG. 1.

As illustrated in FIG. 4B, the coils M1 to M8 of the armature 103 together form a single closed loop as a whole. That is, the coils M1 to M8 form the loop in the order of M1, M4, M7, M2, M5, M8, M3, M6, and M1. FIG. 4B is a diagram showing a circuit formed by the coils M1 to M8, as illustrated in FIG. 4A, in a state developed for the illustrative purposes.

The first embodiment has the following advantages.

(1) As shown in FIGS. 1, 2, 5, 7, and 8, the first insulator X has the separating portions Xc that are arranged in correspondence with the proximal ends of the teeth T1 to T8. Each of the separating portions Xc separates the coil end Ma, or the winding end of the corresponding coil M1 to M8, from the second portion L. The separating portion Xc stops the second portion L from moving radially inward. The first insulator X includes the mounting projections Xd that are located radially inward with respect to the separating portions Xc. Each conductor connecting portion Mb, or a portion of the coil end Ma, is electrically connected to the corresponding connecting portion 116a of the commutator 108 on the associated mounting projection Xd. Such connection is achieved while preventing interference by the second portions L of the coils M1 to M8.

The coil ends Ma, particularly the conductor connecting portions Mb, are mounted on the corresponding mounting projections Xd. Thus, when electrically connecting each conductor connecting portion Mb to the corresponding connecting portion 116a on the mounting projection Xd, the conductor connecting portion Mb is prevented from displacing and stabilized. Therefore, while preventing damage to the second portions L of the coils M1 to M8, or occurrence of a short circuit, the coils M1 to M8 are easily connected to the commutator 108.

(2) Referring to FIG. 2, the mounting projections Xd axially project with respect to the teeth cover portions Xb of the first insulator X, which cover the teeth T1 to T8. This makes it easy to connect, or, for example, weld, the conductor connecting portions Mb to the connecting portions 116a.

For example, if, to the contrary, the teeth cover portions Xb axially project with respect to the mounting projections Xd, the above-described connection process (for example, welding) is interfered by the separating portions Xc and becomes complicated. However, in the first embodiment, the axial distance between each mounting projection Xd and the corresponding separating portion Xc is relatively small. This suppresses interference of the separating portions Xc when the coils M1 to M8 are connected to the commutator 108.

(3) As shown in FIG. 8, each of the separating portions Xc has the opening Xh, which faces radially inward, at a position corresponding to the connecting portion 116a. This further effectively prevents the separating portions Xc from interfering with connection process, or, for example, welding, of the coils M1 to M8 to the commutator 108. In other words, the radial thickness of each separating portion Xc decreases not as a whole but only at the position corresponding to the opening Xh. Therefore, while maintaining the rigidity of the separating portion Xc as a whole, the above-described connection process is facilitated.

(4) Referring to FIG. 2, the position of each of the connecting wires 110 is selected in such a manner as to avoid positions on the mounting projection Xd. Specifically, the connecting wires 110 are arranged at the side corresponding to the second end 12 of the armature core 107 with respect to the axial direction. The commutator 108 is located adjacent to the opposing, first end 11 of the armature core 107. Therefore, the connecting wires 110 are prevented from interfering with connection of the conductor connecting portions Mb to the connecting portions 116a. Accordingly, such connection is facilitated while preventing damage to the connecting wires 110.

(5) As shown in FIG. 7, each mounting projection Xd has a substantially trapezoidal shape as viewed in a radial direction. The angle between the top surface of the mounting projection Xd and each of the inclined surfaces adjacent to the top surface is an obtuse angle. Each winding end Ma of is thus provided along the top surface and the inclined surfaces of the mounting projection Xd. This suppresses excessive bending of the coil end Ma, thus preventing damage to the coil end Ma. Further, by reducing the size of the distal end, or the top surface, of each mounting projection Xd while increasing the size of the proximal end of the mounting projection Xd, the rigidity of the mounting projection Xd is enhanced.

(6) With reference to FIGS. 2 and 8, each of the conductor connecting portions Mb and the corresponding one of the connecting portions 116a are mounted on the associated one of the mounting projections Xd in an axially overlapping manner. This makes it easy to press the connecting portion 116a against the conductor connecting portion Mb and hold these parts in contact with each other. The coils M1 to M8 are thus easily connected to the commutator 108.

Further, each conductor connecting portion Mb is arranged between the corresponding connecting portion 116a and the associated mounting projection Xd. Therefore, for example, when the commutator 108 is fixed under pressure to the rotary shaft 106 to which the armature core 107 has been fixed, the connecting portions 116a are easily pressed against and held in contact with the conductor connecting portions Mb. The corresponding coil M1 to M8 is thus easily connected to the commutator 108.

(7) With reference to FIG. 9, the armature core 107 has the grooves Xg, Yg that are defined between the corresponding adjacent pair of the teeth T1 to T8 and extend in the axial dimension. The conductor D has the relay portions Mc, each of which connects the corresponding conductor connecting portion Mb, which is arranged at the first end 11 of the armature core 107, to the associated connecting wire 110 provided at the second end 12 of the armature core 107. Each relay portion Mc is received in the corresponding one of the grooves Xg, Yg. The relay portions Mc are thus easily maintained at constant positions in a stable manner. In this manner, also the conductor connecting portions Mb and the connecting wires 110 are easily and stably held at predetermined positions.

Further, since the relay portions Mc are received in the grooves Xg, Yg, each relay portion Mc is easily deployed at a position different from the position of the corresponding coil M1 to M8. This suppresses interference of winding of the coils M1 to M8 by the relay portions Mc. The coils M1 to M8 are thus installed with improved accuracy.

(8) Referring to FIGS. 2 and 6, the second insulator Y has the guide portion formed by the outer walls Yc and the inner wall Yd. The guide portion circumferentially guides each of the connecting wires 110 at a position radially inward from the corresponding one of the teeth T1 to T8. Specifically, the outer walls Yc prevent the connecting wires 110 from displacing radially outward while the inner wall Yd prevents the connecting wires 110 from displacing radially inward. This suppresses contact between the connecting wires 110 and the rotary shaft 106 or the coils M1 to M8, thus preventing damage to the connecting wires 110.

Since the inner wall Yd has a substantially cylindrical shape, the connecting wires 110 can be bent in a smoothly curved manner. This suppresses excessive bending of the connecting wires 110 and damage to the connecting wires 110.

The multiple outer walls Yc are aligned in a discontinuous manner. The connecting wires 110 are thus passed through the spaces between the outer walls Yc. This facilitates routing of the connecting wires 110, or the conductor D, from the coils M1 to M8 in radial inward directions by preventing the connecting wires 110 from interfering with the outer walls Yc. Likewise, the connecting wires 110 are easily routed from the coils M1 to M8 in radial outward directions without interfering with the outer walls Yc.

(9) Each of the grooves Xg, Yg is provided as an integral part of the corresponding one of the first and second insulators X, Y, which are formed of resin and thus easy to mold. This facilitates formation of the grooves Xg, Yg.

(10) The guide portion formed by the outer walls Yc and the inner wall Yd is easily formed as an integral body with the second insulator Y, which is formed of resin and thus easy to mold.

Figure 13:
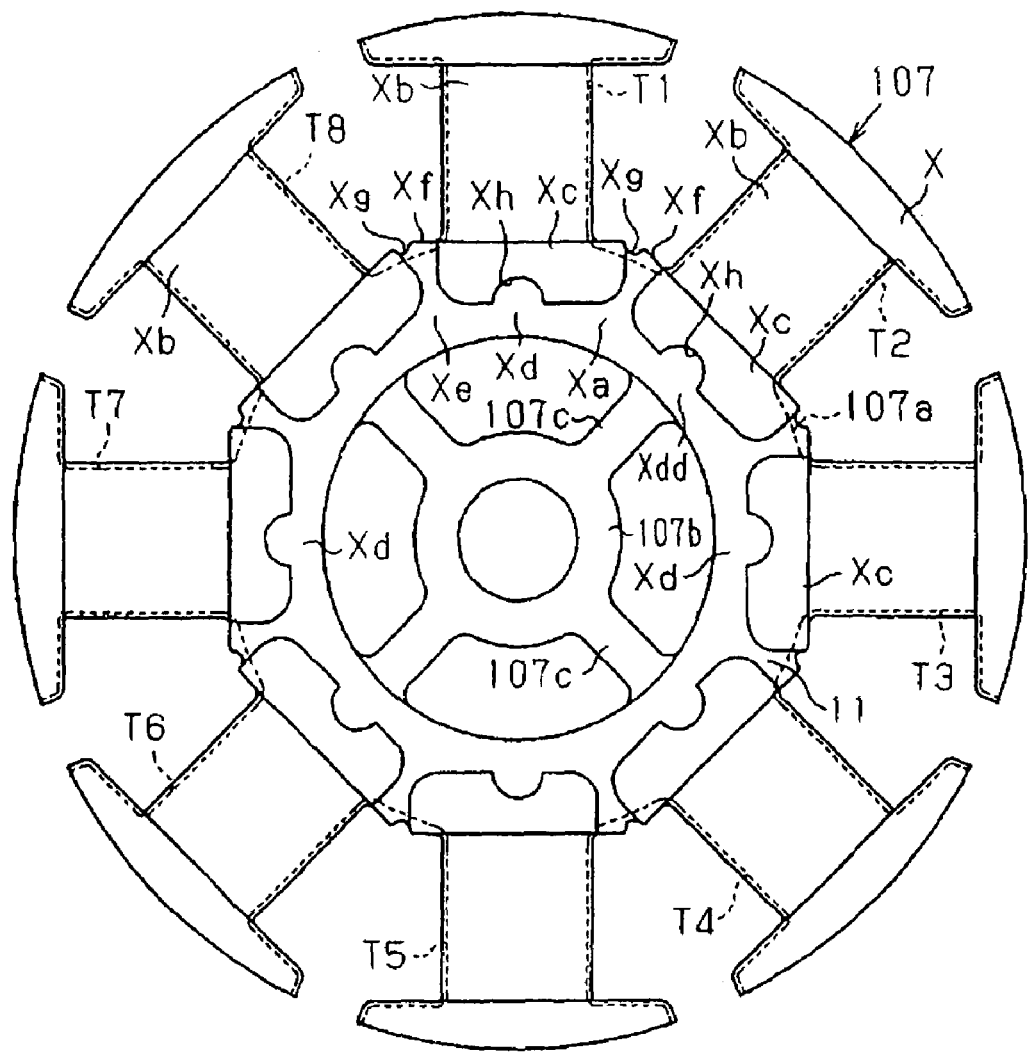
FIG. 13 is a plan view showing a first insulator of an armature core of FIG. 11.
Figure 14:
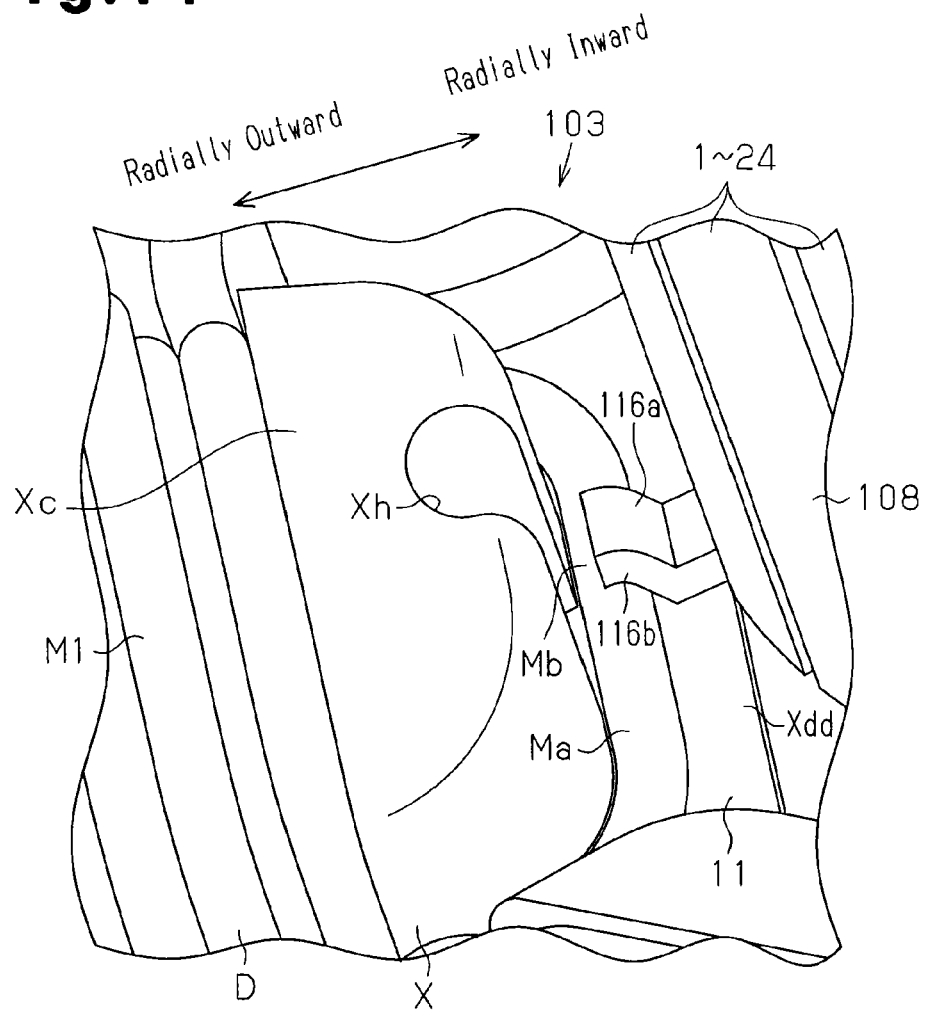
FIG. 14 is an enlarged perspective view showing the connecting portion and a conductor of FIG. 11.

Next, a second embodiment of the present invention will be explained with reference to FIGS. 11 to 16. Referring to FIGS. 13 and 14, in the second embodiment, a mounting portion Xdd is formed by a part of the upper surface of each annular cover portion Xa, not the projection.

Figure 16:
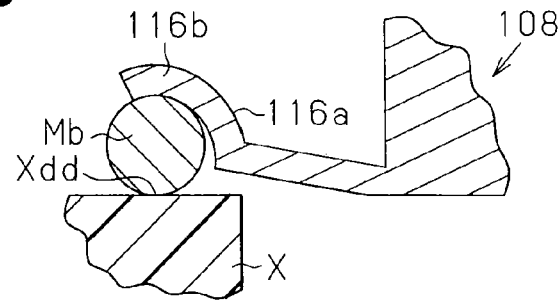
FIG. 16 is a cross-sectional view showing the connecting portion of FIG. 15 in a flexed state.

As illustrated in FIGS. 14 and 16, each connecting portion 116a is pressed against and held in contact with the corresponding conductor connecting portion Mb of the conductor D. In this state, the connecting portion 116a is electrically connected to the conductor connecting portion Mb through welding. Specifically, in the second embodiment, the connecting portion 116a extends radially outward and thus becomes flexible. Through such flexibility, the connecting portion 116a is pressed against and held in contact with the conductor connecting portion Mb of the conductor D.

Further, each connecting portion 116a of the second embodiment has a contact portion 116b formed at a distal end of the connecting portion 116a. The contact portion 116b has an arcuate contact surface that extends substantially along the outer circumferential surface of the conductor D. The radius of curvature of the contact surface is greater than the diameter of the conductor D. The contact surface is formed as an arcuate surface extending in a range less than 180 degrees.

Therefore, for example, the contact portion 116b can be effectively pressed against and held in contact with the conductor D, even if the position of the conductor D is slightly offset with respect to the contact portion 116b. In other words, the acceptable range of an error caused in the contact between each contact portion 116b and the conductor D is enlarged.

To connect the connecting portions 116a to the conductor D, a contact-pressing step and a connecting step are performed. In the contact-pressing step, the commutator 108 is positioned with respect to the armature core 107. In such positioning, the commutator 108 is moved downward from the position of FIG. 15 to the position of FIG. 16. Specifically, by pressing the commutator 108 against the rotary shaft 106 to which the armature core 107 has been fixed, the commutator 108 is fixed to the rotary shaft 106. Through such pressing, the connecting portions 116a are pressed against and held in contact with the conductor connecting portions Mb of the conductor D. At this stage, as illustrated in FIG. 16, the connecting step is performed, or the connecting portions 116a are welded to the conductor connecting portions Mb of the conductor D. The connecting portions 116a are thus electrically connected to the conductor D.

The second embodiment has the following advantages in addition to the advantages of the first embodiment.

(21) A conventional conductor has a free end that is connected to a commutator. The free end is difficult to handle.

However, in the second embodiment, the conductor D includes the coils M1 to M8, which are wound around the corresponding teeth T1 to T8, and the connecting wires 110. The connecting wires 110 are provided continuously from the coils M1 to M8 and connect the coils M1 to M8 together. The conductor of the second embodiment thus does not include a free end. Each connecting portion 116a of the commutator 108 is electrically connected to the corresponding conductor connecting portion Mb of the conductor D through welding, in a state pressed against and held in contact with the conductor connecting portion Mb. The coils M1 to M8 are thus easily connected to the commutator 108.

Such connection process does not involve a step of, for example, holding the connecting portions 116a in tight contact with the conductor D using a jig or a device other than a welding jig. This ensures a larger space for connecting the connecting portions 116a to the conductor D, thus shortening the time needed for accomplishing such connection process.

Figure 15:
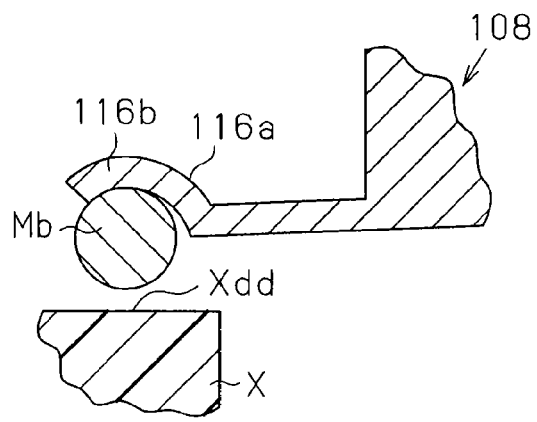
FIG. 15 is a cross-sectional view showing the connecting portion and the conductor of FIG. 14.

(22) The connecting portion 116a shown in FIGS. 15 and 16 is flexible. The connecting portion 116a is thus maintained in contact with the conductor connecting portion Mb in a flexed state, pressing the conductor connecting portion Mb of the conductor D. The flexibility of the connecting portion 116a cancels variation of accuracy for positioning the commutator 108 with respect to the armature core 107, which supports the conductor D. Therefore, even if the positioning accuracy of the connecting portion 116a with respect to the conductor D is varied in the axial direction, the connecting portion 116a is effectively pressed against and held in contact with the conductor D.

Figure 11:
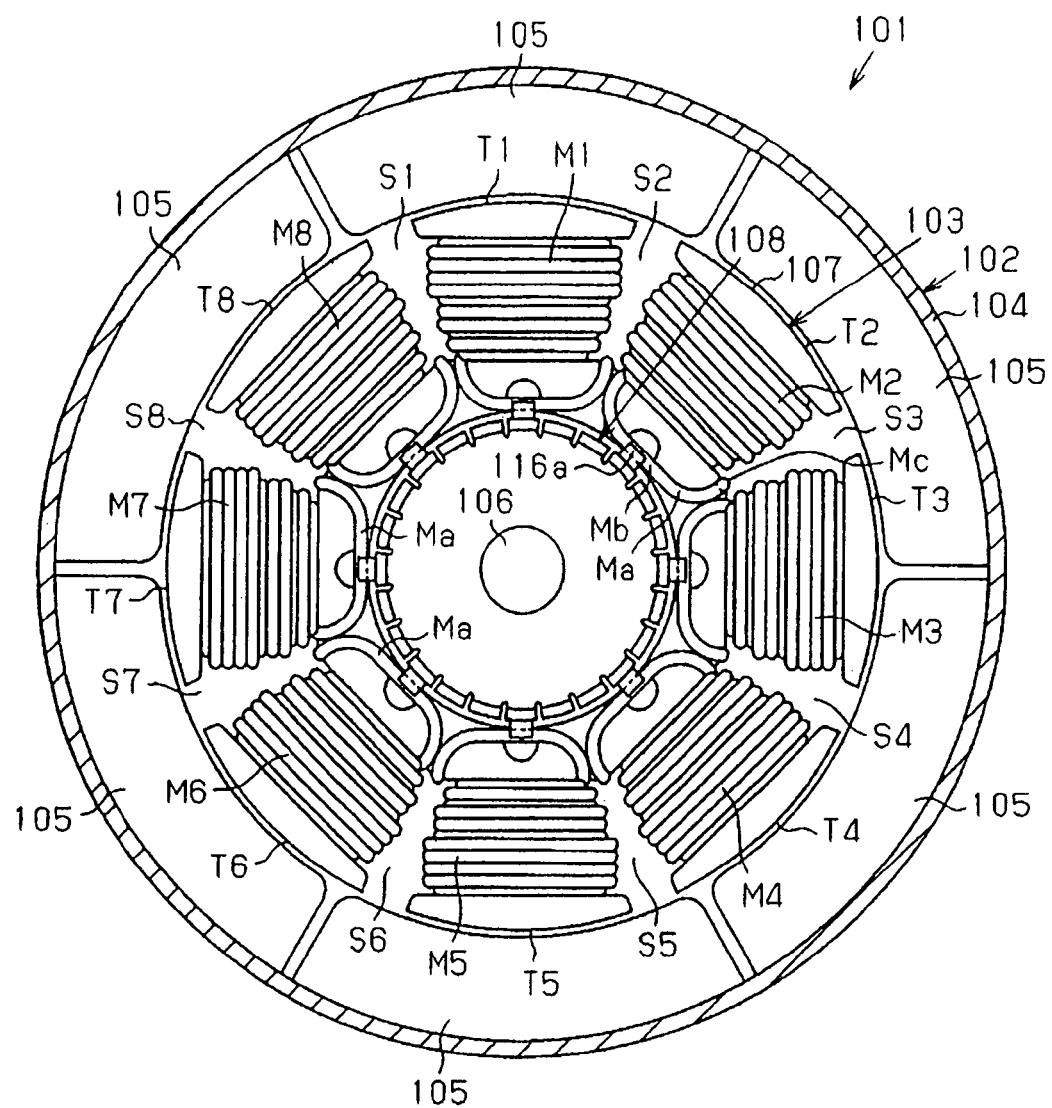
FIG. 11 is a horizontal cross-sectional view showing a motor according to a second embodiment of the present invention.
Figure 12:
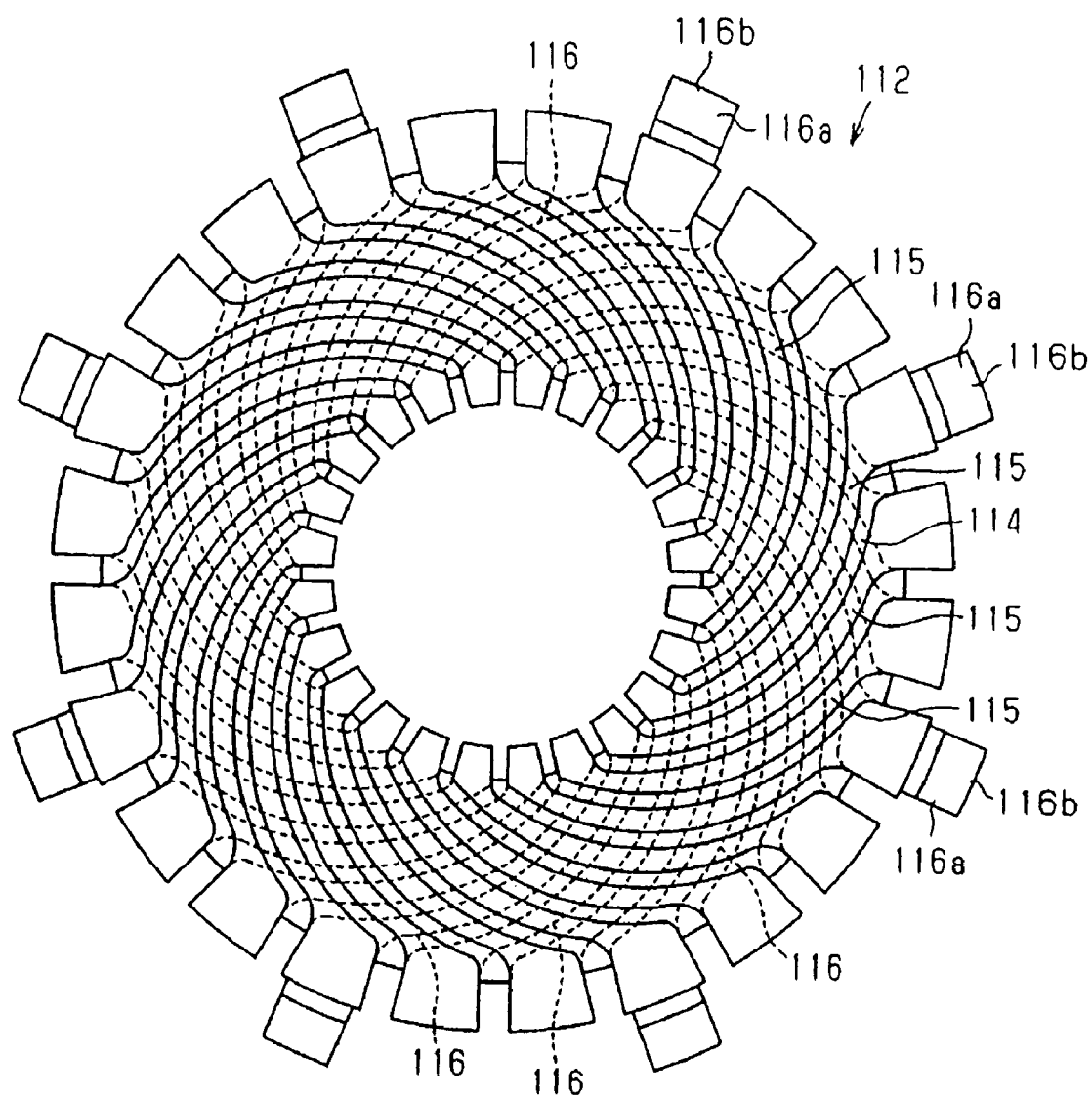
FIG. 12 is a plan view showing a connecting portion and a short circuit member of FIG. 11.

(23) Referring to FIGS. 11 and 14, each of the coils M1 to M8 has the coil end Ma, or a winding end. Each connecting portion 116a is electrically connected to the corresponding conductor connecting portion Mb, or a portion of the coil end Ma. The conductor D is thus stably held at the predetermined position. That is, since the second portion L, which is formed continuously from the coil end Ma, is wound around the corresponding tooth T1 to T8, the coil end Ma does not easily move, compared to the connecting wires 110. This makes it easy to maintain the first conductive connecting portion Mb at the predetermined position. The connecting portion 116a is thus easily pressed against and held in contact with the conductor connecting portion Mb. The coils M1 to M8 are thus further easily connected to the commutator 108.

(24) Each conductor connecting portion Mb of the conductor D is arranged between the connecting portion 116a and the mounting portion Xd. This maintains the connecting portion 116a in a state pressed against and held in contact with the conductor connecting portion Mb reliably and firmly. The coils M1 to M8 are thus easily connected to the commutator 108.

(25) Each connecting portion 116a has the arcuate contact portion 116b that extends substantially along the outer circumferential surface of the conductor D. The contact portion 116b is thus pressed against and held in contact with the conductor connecting portion Mb of the conductor D. This prevents the conductor connecting portion Mb from displacing from the connecting portion 116a. Accordingly, the conductor connecting portion Mb is stably pressed against and held in contact with the connecting portion 116a.

(26) In the contact-pressing step, the commutator 108 is positioned with respect to the armature core 107. Specifically, the commutator 108 is pressed against the rotary shaft 106 to which the armature core 107 has been fixed. In this manner, the connecting portions 116a are pressed against and held in contact with the conductor connecting portions Mb of the conductor D. Afterwards, in the connecting step, the connecting portions 116a are electrically connected to the conductor connecting portions Mb of the conductor D through welding. The connecting portions 116a are thus easily connected to the conductor connecting portions Mb.

In other words, through positioning of the commutator 108 to the armature core 107, which is originally a necessary step, the connecting portions 116a are pressed against and held in contact with the conductor connecting portions Mb of the conductor D. It is thus unnecessary to hold the connecting portions 116a in tight contact with the conductor D when connecting the connecting portions 116a to the conductor connecting portions Mb. This ensures a larger space for connecting the connecting portions 116a to the conductor connecting portions Mb and saves the time spent for such connection process.

Figure 17:
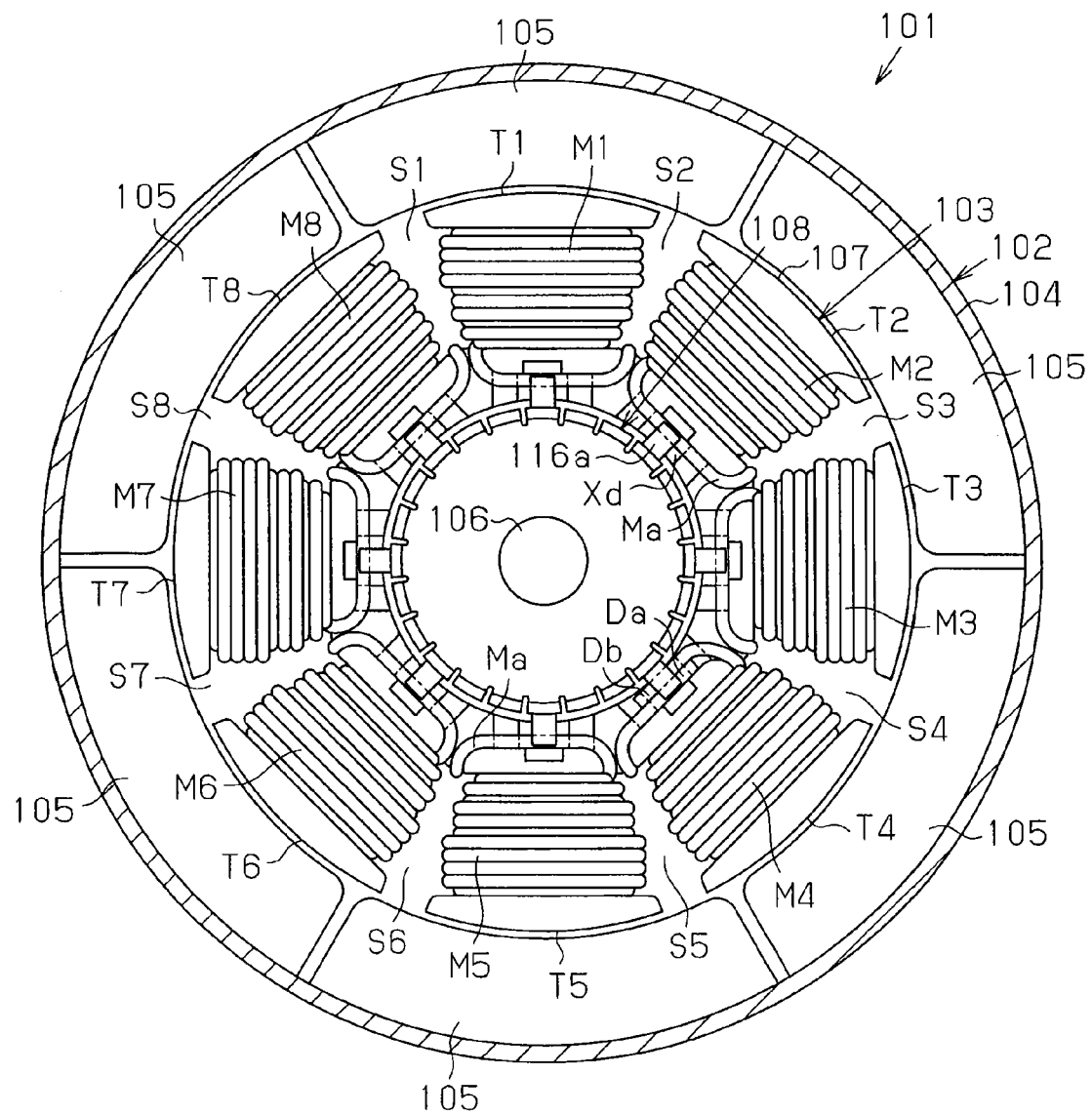
FIG. 17 is a horizontal cross-sectional view showing a motor according to a third embodiment of the present invention.

A third embodiment of the present invention will now be described with reference to FIGS. 17 to 20. As shown in FIG. 17, the conductor D of the third embodiment has a first terminal Da and a second terminal Db, which are opposing ends. The terminals Da, Db are electrically connected to each other at the positions corresponding to the tooth T4, or the coil M4. The first terminal Da is a winding start end of the coil M1 and wound finally. The first terminal Da is arranged at the position corresponding to the tooth T4 by the connecting wire 110. The second terminal Db is a winding finish end and wound finally. The second terminal Db is arranged at the position corresponding to the tooth T4. By electrically connecting the first terminal Da to the second terminal Db, a closed loop is formed.

Each of the portions of the conductor D corresponding to the teeth T1 to T8 is radially separated by a separating portion Xc to a first portion and a second portion L.

Specifically, with reference to FIGS. 19 and 20, the first and second terminals Da, Db are arranged adjacent to each other. The first and second terminals Da, Db correspond to the first portion of the conductor D in the tooth T4. The first and second terminals Da, Db are arranged radially inward with respect to the separating portion Xc and on the mounting projection Xd. The separating portion Xc restricts movement of the first and second terminals Da, Db in a radial outward direction. The coil M4, which is the second portion of the conductor D in the tooth T4, is wound around the teeth T1 to T8 at positions radially outward from the separating portions Xc, which restricts movement of the coil M4 in a radial inward direction.

In other words, the separating portion Xc separates the portion of the conductor D corresponding to the tooth T4 to the two terminals Da, Db, or the first portion of the conductor D, and the coil M4, which is a part of the second portion. The first and second terminals Da, Db are arranged radially adjacent to each other, as illustrated in FIGS. 19 and 20. That is, the first terminal Da and the second terminal Db extend perpendicularly to a radial direction.

With reference to FIG. 17, each of the coils M1 to M3 and M5 to M8, which does not include the two terminals Da, Db, has a coil end Ma, or a first portion that is a final turn of the winding of the coil, and a second portion L. Except for the coil end Ma, the second portion L is wound around the corresponding tooth T1 to T3, T5 to T8 at a position radially outward from the associated separating portion Xc. Radial inward movement of the second portion L is restricted by the separating portion Xc. Each conductor connecting portion Mb, or a portion of the coil end Ma, is mounted on the corresponding mounting projection Xd, which is located radially inward from the associated separating portion Xc. In other words, each separating portion Xc separates the corresponding coil M1 to M3, M5 to M8 to the coil end Ma, or the first portion, and the second portion L.

The third embodiment has the following advantages additionally.

(31) As shown in FIGS. 17, 19, and 20, the separating portions Xc are arranged in the first insulator X in correspondence with the proximal ends of the teeth T1 to T8. Each of the separating portions Xc separates the conductor D to the two terminals Da, Dn, or the first portion, and the coil end M4, or the second portion, in such a manner that the first portion and the second portion are arranged radially adjacent to each other. The terminals Da, Db are located adjacently and electrically connected to each other. The terminals Da, Db are provided radially inward from the separating portion Xc. The terminals Da, Db are held in contact with and electrically connected to the corresponding connecting portion 116a of the commutator 108. Therefore, when the two terminals Da, Db are connected to the connecting portion 116a, the second portion of the conductor D, or, for example, the coil M4, is prevented from interfering with such connection. As a result, while preventing damage to the coil M4, or a short circuit, the terminals Da, Db are easily connected to the connecting portion 116a.

(32) Referring to FIGS. 17, 19, and 20, the two terminals Da, Db are arranged radially adjacent to each other. This allows positioning of the terminals Da, Db by, for example, pulling the terminals Da, Db in the same direction as the winding direction of a winding device. Thus, following winding of the coils, the winding device is allowed to easily position the terminals Da, Db. In other words, the two terminals Da, Db are arranged adjacent to each other without performing a separate and complicated operation specifically for positioning of the terminals Da, Db.

Figure 18:
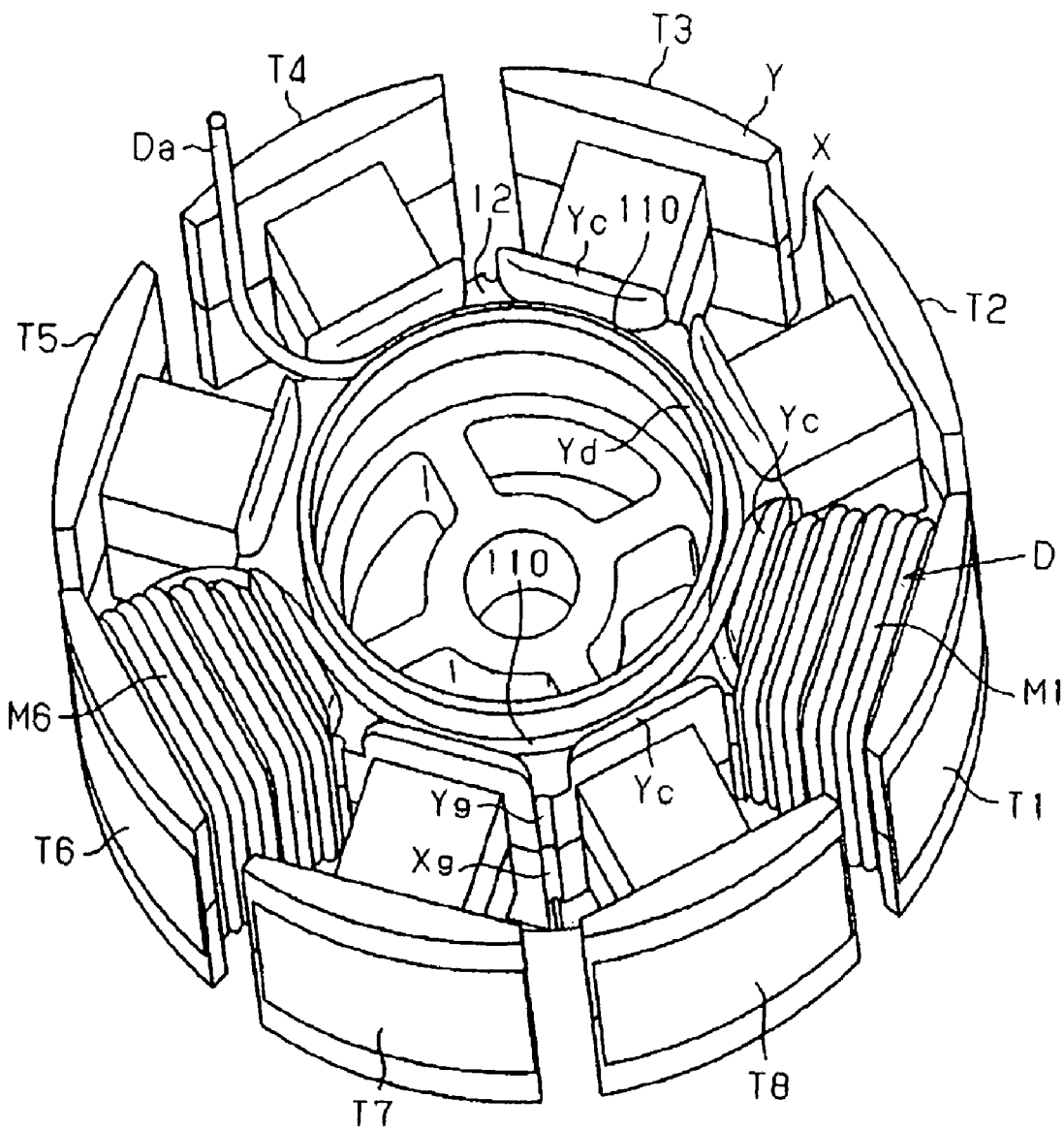
FIG. 18 is a bottom perspective view showing an armature core of FIG. 17 in a step of winding a coil around the armature core.

(33) As illustrated in FIG. 18, the multiple coils M1 to M8 and the connecting wires 110, which connect the coils M1 to M8 together, are formed by the single conductor D as a continuous body. This decreases the number of the terminals Da, Db in the armature core 107, compared to a case in which the coils M1 to M8 and the connecting wires 110 are formed by a plurality of conductor portions obtained by cutting a single conductor apart. Further, handling of the coils M1 to M8 becomes easy. Specifically, if the armature core 107 has a number of terminals of the conductor D, it is necessary to support the terminals at a number of positions. However, in the third embodiment, such supporting becomes unnecessary.

(34) Referring to FIG. 17, in each of the teeth T1 to T3 and T5 to T8 in which the two terminals Da, Db are not arranged, the coil end Ma, or the first portion of the corresponding one of the coils M1 to M3 and M5 to M8, is located radially inward from the associated separating portion Xc as the first portion of the conductor D. The coil end Ma is radially separated from the second portion L. The coil end Ma is held in contact with and electrically connected to the corresponding connecting portion 116a of the commutator 108. Therefore, when connecting the conductor connecting portions Mb to the connecting portions 116a, the second portion of the conductor D, or, for example, the second portions L of the coils M1 to M3 and M5 to M8, are prevented from interfering with such connection.

By winding the coil ends Ma around the teeth T1 to T3 and T5 to T8, movement of each coil end Ma is restricted and the coil end Ma is maintained in a stable state. The coil end Ma is thus stably connected to the corresponding connecting portion 116a. Therefore, even at positions at which the two terminals Da, Db are not provided, the conductor D is easily connected to the connecting portions 116a while preventing damage to a portion of each coil M1 to M3 and M5 to M8 except for the coil end Ma, or a short circuit.

(35) As shown in FIG. 20, each mounting projection Xd axially projects from the corresponding tooth cover portion Xb, which covers the associated tooth T1 to T8. This facilitates connection, or welding, of the terminals Da, Db, or the first portion of the conductor D, and the coil end Ma to the connecting portion 116a, compared to a case in which the mounting projection Xd does not project axially from the tooth cover portion Xb.

For example, in the case in which the mounting projection Xd does not project axially from the tooth cover portion Xb, electrical connection (for example, welding) is hampered by the separating portion Xc and thus becomes complicated. However, in the third embodiment, the axial interval between the mounting projection Xd and the separating portion Xc becomes small, and the electrical connection becomes less complicated.

Figure 21:
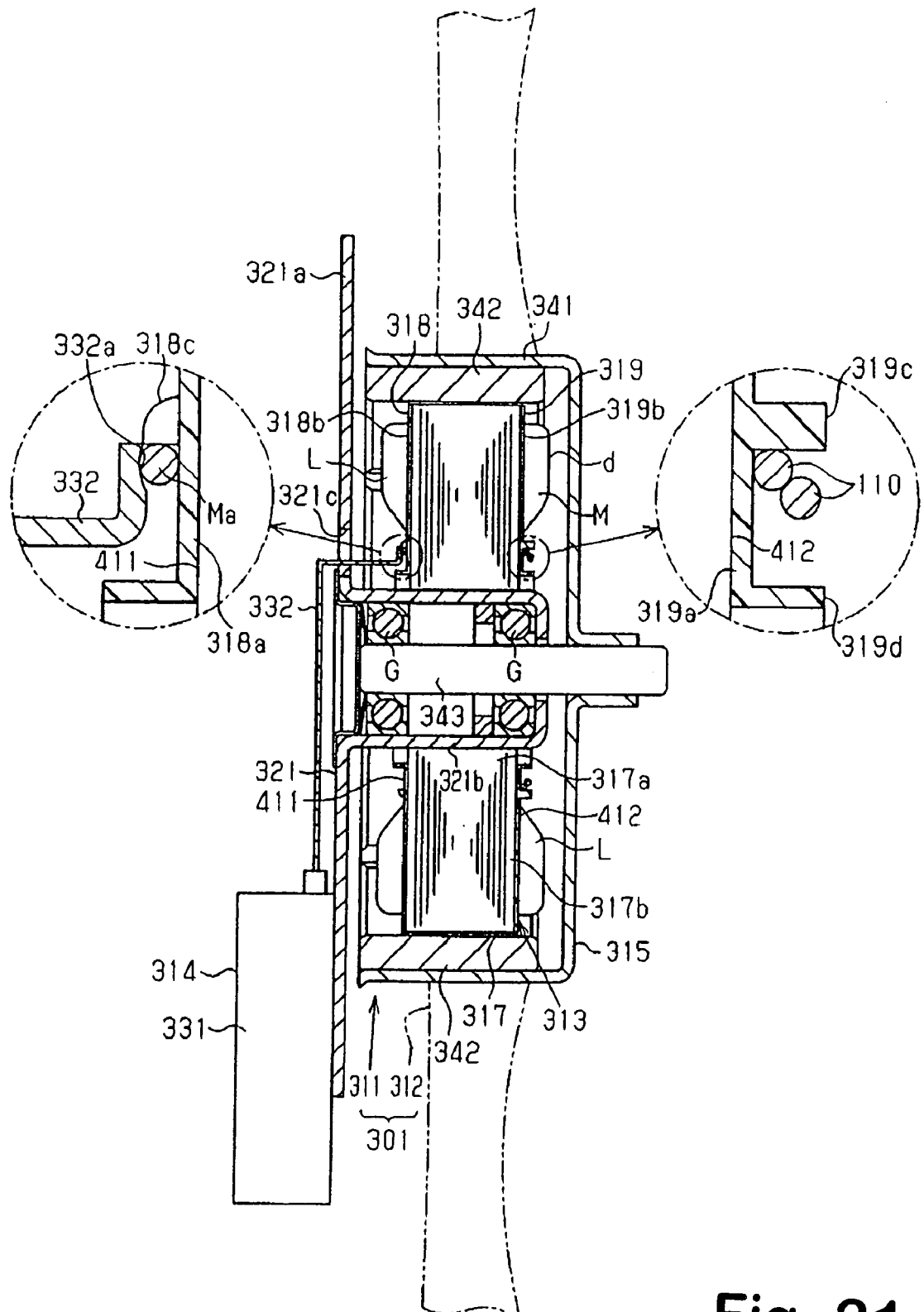
FIG. 21 is a vertical cross-sectional view showing a motor according to a fourth embodiment of the present invention.

A fourth embodiment of the present invention will hereafter be described with reference to FIGS. 21 to 23. As shown in FIG. 21, an engine cooling electric fan device 301 includes a brushless motor 311 and a fan 312. The brushless motor 311 has a stator 313, a circuit device 314, and a rotor 315.

With reference to FIG. 21, a stator 313, or an armature, includes a stator core 317, a first insulator 318, a second insulator 319, and a conductor D. The first insulator 318 and the second insulator 319 are mounted in the stator core 317. The stator core 317 has a cylindrical portion 317a and a plurality of teeth 317b (see FIG. 22), which extend radially from the cylindrical portion 317a. Referring to FIG. 22, the fourth embodiment includes twelve teeth 317b. The conductor D is formed by continuously connecting a plurality of coils M and connecting wires 110, which interconnect the coils M. Each of the coils M is wound around the corresponding one of the teeth 317b through the first and second insulators 318, 319.

In the fourth embodiment, the coils M correspond to any one of three phases, or phase U, phase V, and phase W. The coils M are provided in a circumferential direction in such a manner that two of the coils M corresponding to the same phase are arranged adjacently and the phases of the coils M are alternated. In other words, the coils M are arranged in the order of phase U, phase U, phase V, phase V, phase W, phase W, phase U, phase U, . . . . In the fourth embodiment, each of the connecting wires 110 connects the corresponding coils M wound around the teeth 17b that are not adjacently provided in the circumferential direction, or, in other words, spaced by two or more teeth in the circumferential direction.

As shown in FIG. 21, the stator 313 is fixed to a center piece 321. The center piece 321 includes a substantially disk-like plate portion 321a and a cylindrical portion 321b projecting from the plate portion 321a. The cylindrical portion 317a of the stator core 317 is arranged around the cylindrical portion 321b of the center piece 321.

The first insulator 318 and the second insulator 319 are formed of insulating resin. The first insulator 318 includes an annular cover portion 318a and a plurality of tooth cover portions 318b. The second insulator 319 includes an annular cover portion 319a and a plurality of tooth cover portions 319b.

Referring to FIG. 21, the stator core 317 has a first end 411 and a second end 412 opposed to the first end 411, as viewed axially. The first end 411 is arranged at the side corresponding to the plate portion 321a of the center piece 321. The first insulator 318 covers the portion of the stator core 317 closer to the first end 411, which is the left portion of the stator core 317 as viewed in FIG. 21 and the portion of the stator core 317 closer to the viewer of FIG. 22. The second insulator 319 covers the portion of the stator core 317 closer to the second end 412, which is the right portion of the stator core 317 as viewed in FIG. 21 and the portion of the stator core 317 farther from the viewer of FIG. 22. The tooth cover portions 318b, 319b cover the teeth 317b.

Figure 22:
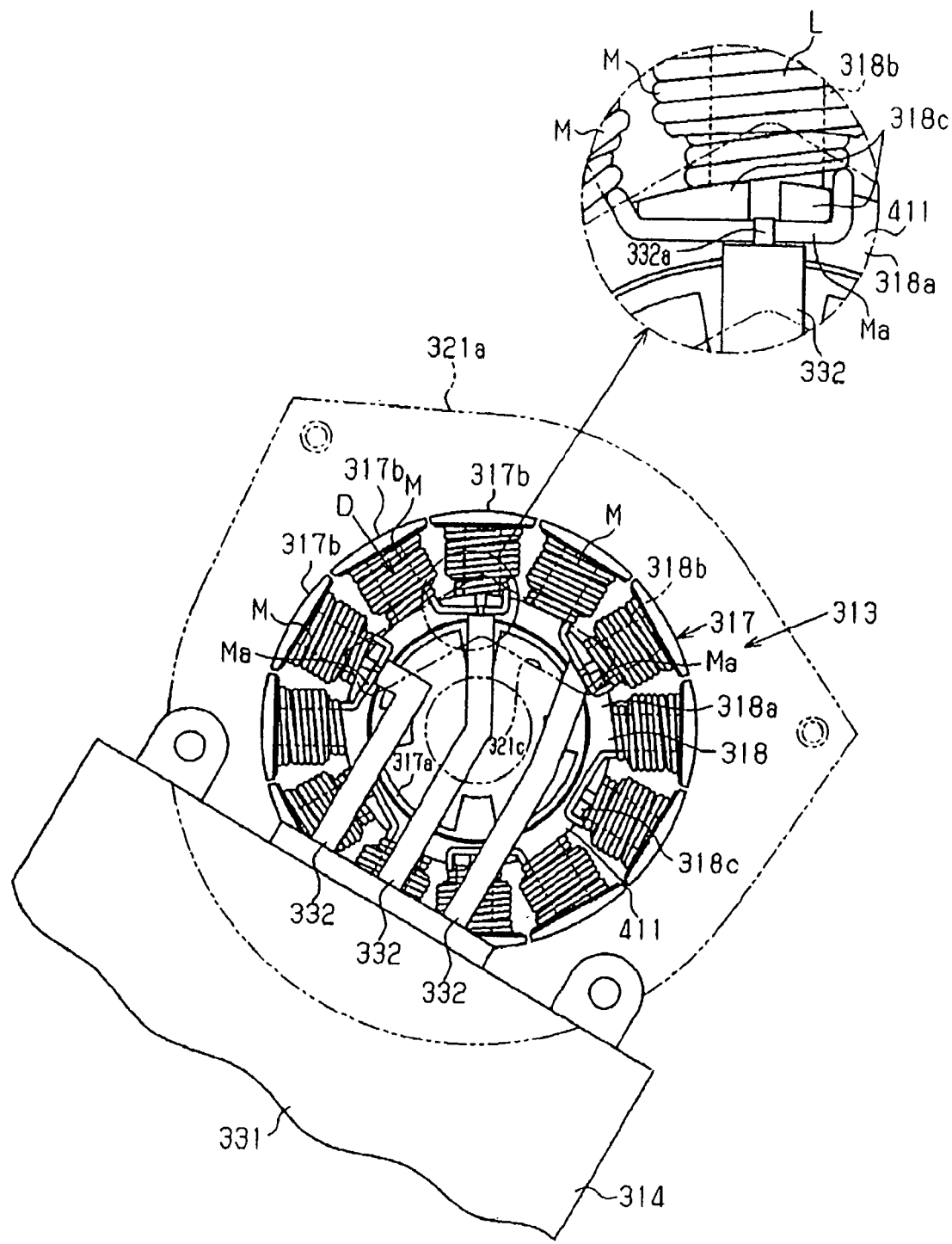
FIG. 22 is a plan view showing a stator and a circuit device of FIG. 21.

With reference to FIG. 22, the first insulator 318 includes a plurality of (six) separating portions 318c. The separating portions 318c are arranged in correspondence with every other one of the tooth cover portions 318b in the circumferential direction. Specifically, each of the separating portions 318c of the fourth embodiment axially projects at a position radially outward from the annular cover portion 318a. Each separating portion 318c separates a coil end Ma, or a first portion of the coil M, from a second portion L of the coil M in a radial inward direction. In the fourth embodiment, each coil end Ma corresponds to the final turn of the winding of the coil M. Each coil end Ma of phase U is connected to another coil end Ma of phase U. Each separating portion 318c has a groove that is defined in a circumferential center portion of the corresponding tooth cover portion 318b. In other words, each separating portion 318c has a pair of projections that are arranged adjacently in the circumferential direction of the brushless motor 311.

As illustrated in FIG. 21, the second insulator 319 has an outer wall 319c functioning as a guide portion and an inner wall 319d. The outer wall 319c and the inner wall 319d guide the connecting wires 110 at positions radially inward from the teeth 317b.

Referring to FIG. 21, the coils M are wound around the corresponding teeth 317b of the stator core 317, in which the first and second insulators 318, 319 are mounted, by way of concentrated winding. Prescribed ones of the coils M are connected together by the corresponding one of the connecting wires 110 at a position closer to the second end 412 of the stator core 317 (at the right side of the stator core 317 as viewed in the drawing).

As shown in FIGS. 21 and 22, the circuit device 314 has a resin casing 331, which accommodates a circuit (not illustrated), and a plurality of connection terminals 332. The circuit in the resin casing 331 includes a switching element that generates a drive current supplied to the coils M. The connection terminals 332 project from the resin casing 331 to the exterior. Each of the connection terminals 332 functions as a connecting portion that is electrically connected to the corresponding one of the coil ends Ma of the conductor D. As illustrated in FIG. 22, three connection terminals 332 are provided in correspondence with three coil ends Ma. Referring to FIGS. 21 and 23, each connection terminal 332 has a contact portion 332a, which directly contacts the corresponding coil end Ma. The contact portion 332a has an arcuate contact surface having a radius of curvature greater than the radius of the cross section of the coil end Ma.

The resin casing 331 is fixed to the plate portion 321a of the center piece 321, thus fixing the circuit device 314 to the stator 313. The plate portion 321a of the center piece 321 has a through hole 321c through which the connection terminals 332 are axially passed. The connection terminals 332 and the annular cover portion 318a of the first insulator 318 are arranged in such a manner that the coil ends Ma of the conductor D are provided between the connection terminals 332 and the annular cover portion 318a in an axial direction. The connection terminals 332 are electrically connected to the coil ends Ma through welding. Each contact portion 332a is arranged in correspondence with a circumferential center portion of the corresponding tooth cover portion 318b. With reference to FIGS. 22 and 23, each contact portion 332a is arranged in the groove of the corresponding separating portion 318c. The coil ends Ma of the conductor D and the connection terminals 332, which are schematically shown in FIGS. 21 and 23, are electrically connected mutually and fixed through laser welding involving radiation of laser beams.

As illustrated in FIG. 21, the rotor 315 has a yoke 341 having a lidded cylindrical shape, a plurality of magnets 342 fixed to the inner circumferential surface of the yoke 341, and a rotary shaft 343 fixed to a central portion of the yoke 341. The rotor 315 is arranged in such a manner that the magnets 342 oppose the outer circumferential surface of the stator core 317. The rotary shaft 343 is rotatably supported by a bearing G, which is held by the cylindrical portion 321b of the center piece 321. The fan 312 is secured to the outer circumferential surface of the yoke 341.

The fourth embodiment has the following advantages additionally.

Figure 23:
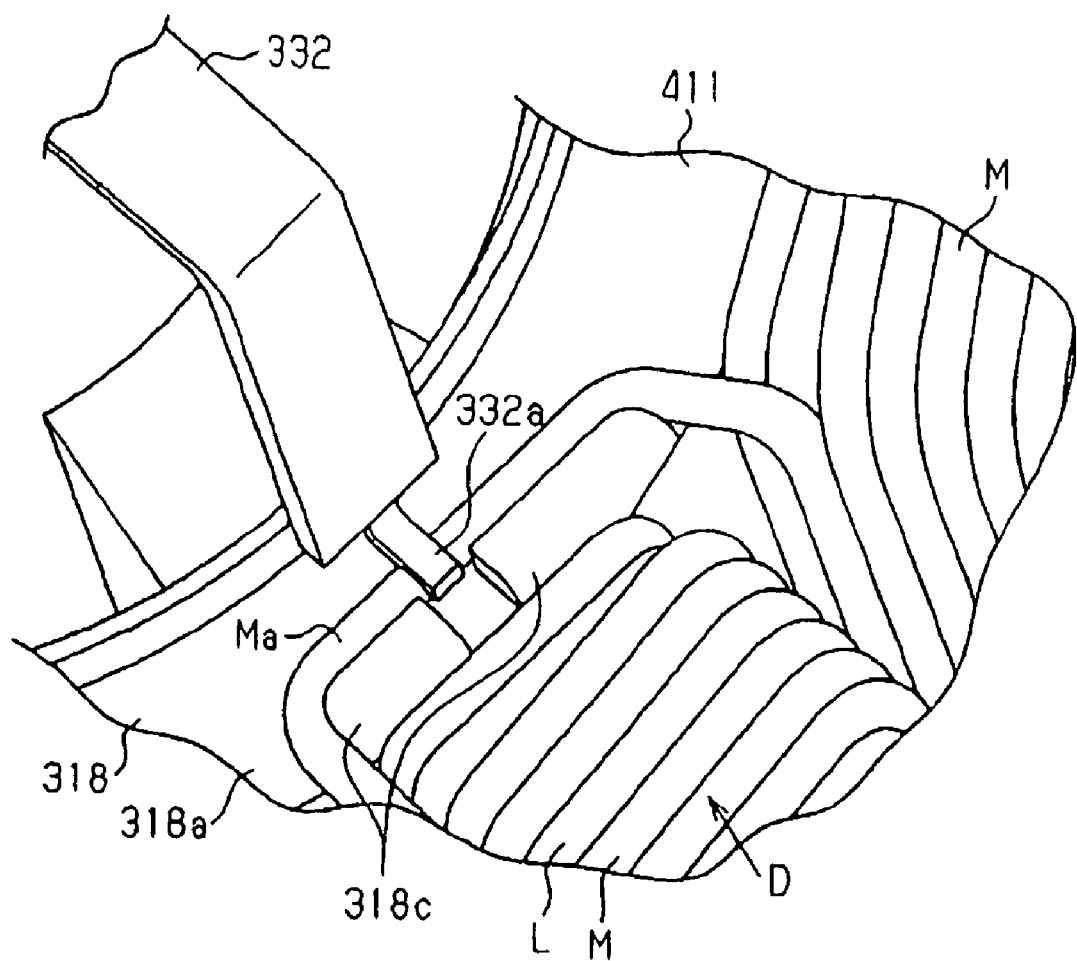
FIG. 23 is an enlarged perspective view showing connection between a connection terminal and a coil of FIG. 22.

(41) As illustrated in FIGS. 21 to 23, each separating portion 318c, which is formed at a position closer to the first end 411 of the first insulator 318, separates the coil end Ma from the second portion L in a radial inward direction. The connection terminals 332 are electrically connected to the coil ends Ma. This prevents the second portions L from interfering with welding of the connection terminals 332 to the coil ends Ma. Movement of the coil ends Ma, which are wound around the teeth 317b, is thus restricted and each coil end Ma is maintained in a stable state. Welding is thus performed in a stable state. Accordingly, while preventing damage to the second portion L of each coil M, or a short circuit, such welding is carried out easily.

(42) Referring to FIG. 21, the connecting wires 110 are arranged at the positions closer to the second end 412 of the stator core 317. At the second end 412, the connection terminals 332 are welded to the coil ends Ma of the conductor D. Such welding is thus prevented from being interfered by the connecting wires 110. Therefore, the welding is performed easily while preventing damage to the connecting wires 110.

(43) With reference to FIGS. 21 and 23, the connection terminals 332 are electrically connected to the coil ends Ma of the conductor D directly through welding. This makes it unnecessary to separately provide the terminals to which the conductor D and the connection terminals 332 are connected.

The number of the components is thus decreased. Further, a step of assembling the terminals with the stator core 317 is omitted. Also, a step of electrically connecting the conductor D to the terminals, which is, for example, a step of fusing the conductor D to the terminals by pressing the conductor D against the terminals, is omitted.

Figure 24:
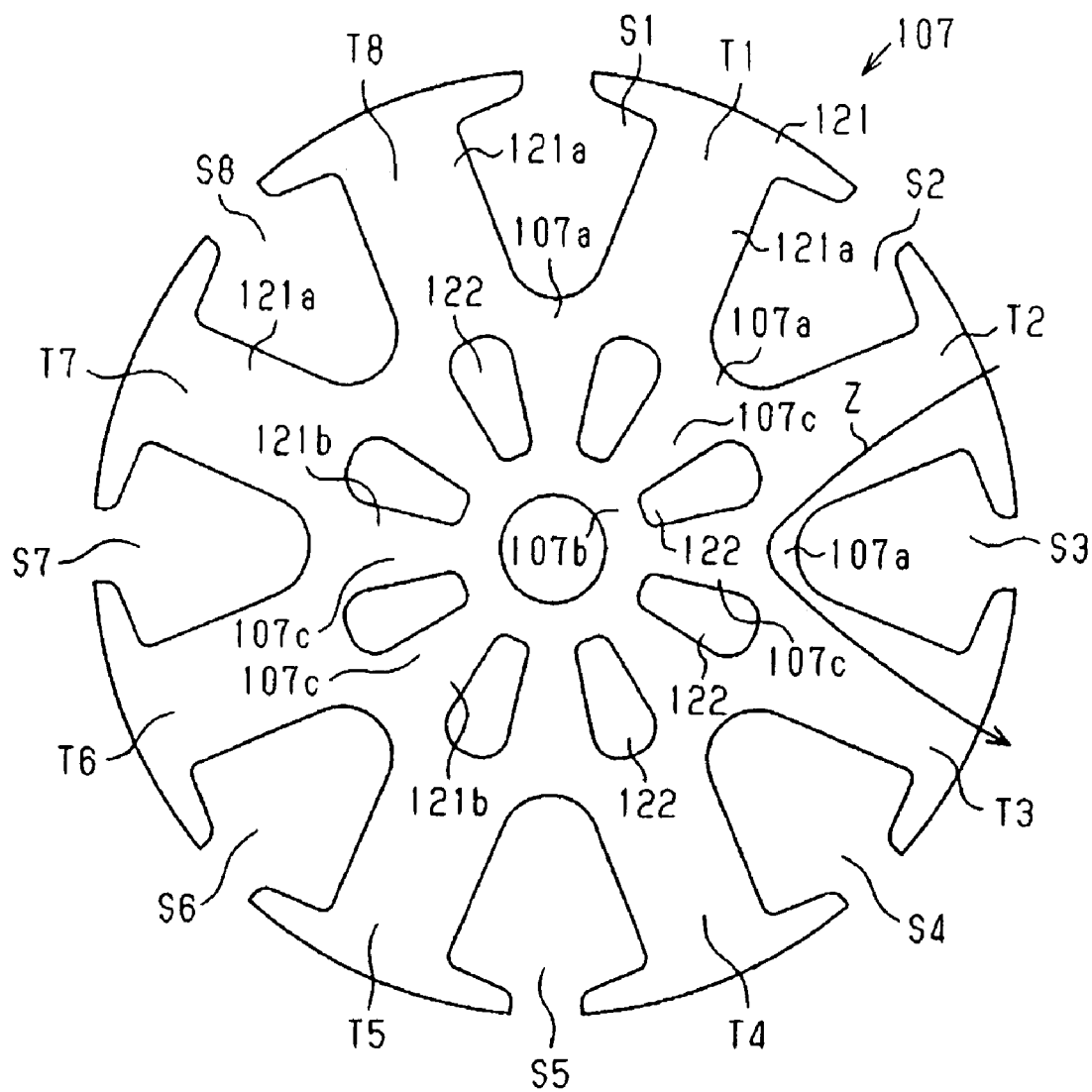
FIG. 24 is a plan view showing a core sheet of a motor according to a fifth embodiment of the present invention.

A firth embodiment of the present invention will now be explained. As shown in FIG. 24, radial connecting portions 107*c* are arranged between each adjacent pair of the teeth T1 to T8 in a circumferential direction.

Specifically, an armature core 107 is formed by stacking a plurality of core sheets 121 having identical shapes in an axial direction (in a direction perpendicular to the sheet surface of FIG. 24). In FIG. 2, for example, the boundaries between the core sheets 121 are not illustrated. Referring to FIG. 24, each of the core sheets 121 has eight tooth forming portions 121*a* and eight radial portions 121*b*. The tooth forming portions 121*a* are spaced at equal angular intervals to form the teeth T1 to T8. The radial portions 121*b* are spaced at equal angular intervals to form the radial connecting portions 107*c*. The core sheets 121 are stacked together in such a manner that the components of the core sheets 121, or the tooth forming portions 121*a* and the radial portions 121*b*, agree with the corresponding components in a circumferential direction.

As illustrated in FIG. 24, the circumferential connecting portions 107*a* extend substantially in an arcuate shape about the center of the armature core 107, or the rotary shaft 106, as the axial center. In the fifth embodiment, the width of each radial connecting portion 107*c* becomes greater in a radial outward direction from the axial center as viewed in an axial direction. The radial connecting portions 107*c* and the circumferential connecting portions 107*a* form a portion of a magnetic path of a magnetic flux flowing in each adjacent pair of the teeth T1 to T8 in a circumferential direction. In FIG. 24, arrow Z schematically represents an example of the magnetic flux flowing in each adjacent pair of the teeth T1 to T8 in the circumferential direction. Further, the armature core 107, which is configured as above-described, has clearances 122 arranged circumferentially adjacent to the radial connecting portions 107*c*. In other words, each of the clearances 122 is provided between each adjacent pair of the radial connecting portions 107*c* in the circumferential direction. The clearances 122 are located radially inward from the teeth t1 to T8.

The fifth embodiment has the following advantages.

(51) The armature core 107 of FIG. 24 has the clearances 122, which are arranged adjacent to the radial connecting portions 107*c* in the circumferential direction. That is, each of the clearances 122 is provided between each adjacent pair of the radial connecting portions 107*c* in the circumferential direction. Since the coils M1 to M8 are wound by way of concentrated winding, the armature core 107 easily generates heat. Nonetheless, the clearances 122 enhance heat radiating performance of the armature core 107.

(52) Each radial connecting portion 107*c* is located in correspondence with the position between each adjacent pair of the teeth T1 to T8 in the circumferential direction. Therefore, the clearances 122 are provided at positions radially inward from the teeth T1 to T8 in which heat generation concentrates. This further improves the heat radiating performance of the armature core 107, compared to a case in which the positions of the radial connecting portions 107*c* correspond to the positions of the teeth T1 to T8 in the circumferential direction, or a case in which the clearances are located between each adjacent pair of the teeth T1 to T8 in the circumferential direction.

(53) Conventionally, a clearance is defined by providing a separate connecting member between a rotary shaft and an armature core. In the fifth embodiment, the number of the component becomes less that that of the conventional technique.

(54) The radial connecting portions 107*c* of FIG. 24 are arranged between each adjacent pair of the teeth T1 to T8 in the circumferential direction. Therefore, as indicated by arrow Z of FIG. 24, the circumferential connecting portion 107*a* and the radial connecting portion 107*c* easily ensure magnetic path for a magnetic flux flowing in the tooth T2 and the tooth T3, which are arranged adjacently in the circumferential direction.

If the circumferential positions of the radial connecting portions 107*c* correspond to the circumferential positions of the teeth T1 to T8, the magnetic flux is defined mainly by the circumferential connecting portions 107*a* solely. In this case, the size of each circumferential connecting portion 107*a* must be increased to avoid magnetic saturation. Specifically, it is necessary to increase the cross-sectional area of each circumferential connecting portion 107*a*, particularly, the width of each circumferential connecting portion 107*a* as viewed in the axial direction. This decreases the size of each clearance 122, thus reducing the size of each slot S1 to S8, which is provided between the corresponding adjacent pair of the teeth T1 to T8.

However, in the fifth embodiment, the radial connecting portions 107*c* are easily employed as a portion of a magnetic flux. The size of each clearance 122 and that of each slot S1 to S8 are thus increased while avoiding the magnetic saturation. Further, the heat radiating performance of the armature core 107 improves and the lamination factor of each coil M1 to M8 increases.

(55) The armature core 107 is formed by staking the core sheets 121 having the identical shapes. This suppresses increase of the number of the components.

(56) The components of each core sheet 121 of FIG. 24, or the tooth forming portions 121*a* and the radial portions 121*b*, are stacked with and located circumferentially in correspondence with the corresponding components of an adjacent one of the core sheets 121. The radial connecting portions 107*c* thus extend continuously along the axial direction of the core sheets 121. This increases rigidity of the core sheets 121, particularly, the force generated by the armature core 107 to support the teeth T1 to T8.

The illustrated embodiments may be modified in the following forms.

Each of the circumferential connecting portions 107*a* may be shaped in any suitable manner as long as the shape of each circumferential connecting portion 107*a* allows connection of the proximal ends of the corresponding teeth T1 to T8 in the circumferential direction. Each of the radial connecting portions 107*c* may be shaped in any suitable manner as long as the radial connecting portion 107*c* connects the corresponding circumferential connecting portion 107*a* to the fixing portion 107*b* by extending radially inward from the circumferential connecting portion 107*a*.

Figure 25:
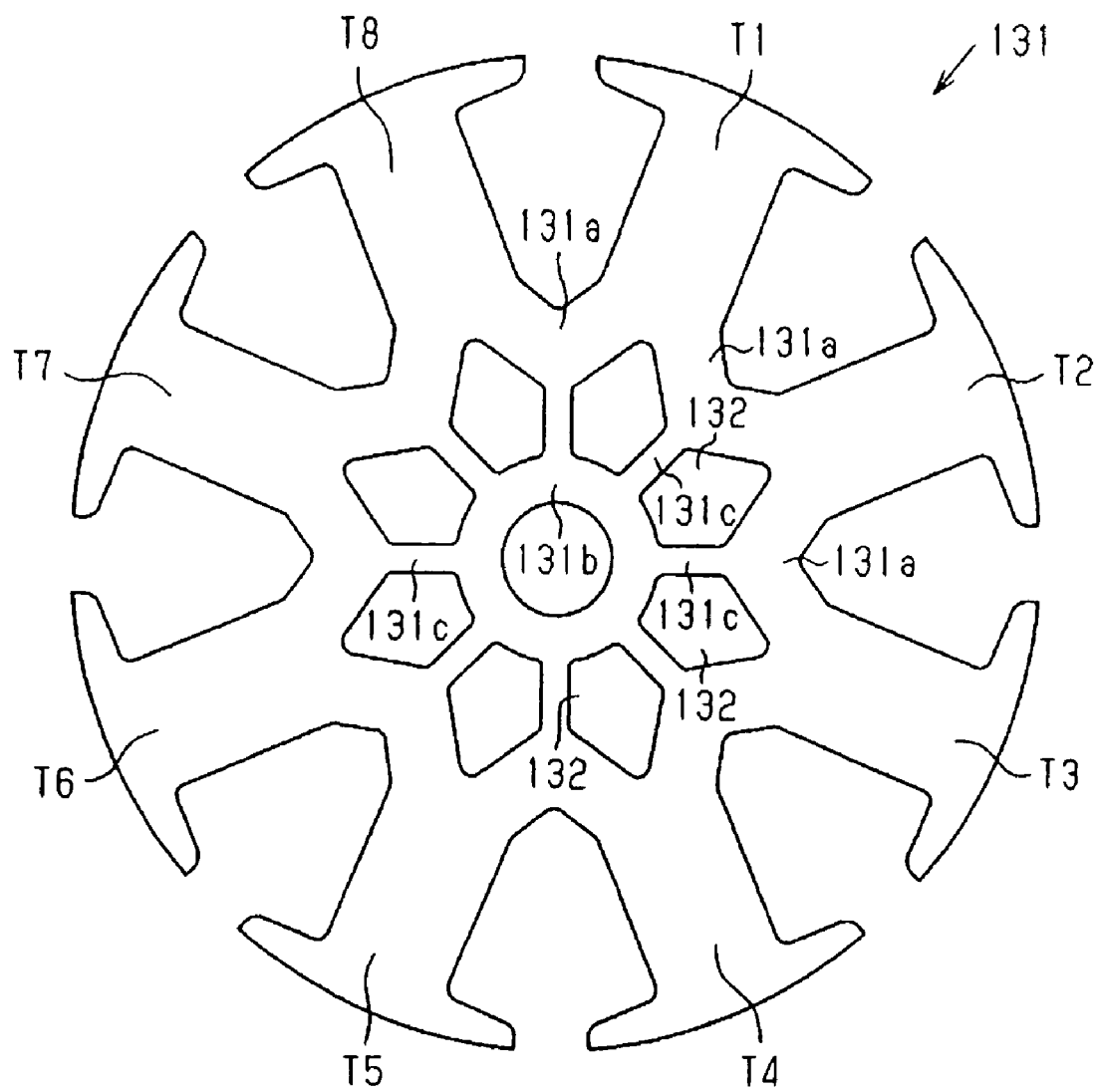
FIG. 25 is a plan view showing a core sheet of a motor of a modified embodiment of the invention.

For example, as shown in FIG. 25, each of circumferential connecting portions 131*a* of an armature core 131 projects radially inward in a V-shaped manner. Each of radial connecting portions 131*c* has uniform width from the radial inner end of the corresponding circumferential connecting portion 131*a*, or the point of the V shape, to the fixing portion 131*b*, as viewed in an axial direction. Clearances 132 each have a substantially pentagonal shape. The clearances 132 are arranged adjacent to the radial connecting portions 131*c* in the circumferential direction. In other words, each of the clearances 132 is located between the corresponding adjacent pair of the radial connecting portions 131*c*. Each radial connecting portion 131c is located in correspondence with the position between the corresponding adjacent pair of the teeth T1 to T8 in the circumferential direction. The clearances 132 are arranged radially inward from the teeth T1 to T8 in which heat generation concentrates. The armature core 131 of FIG. 25 has the same advantages as those of the armature core 107 of FIG. 24.

Figure 26:
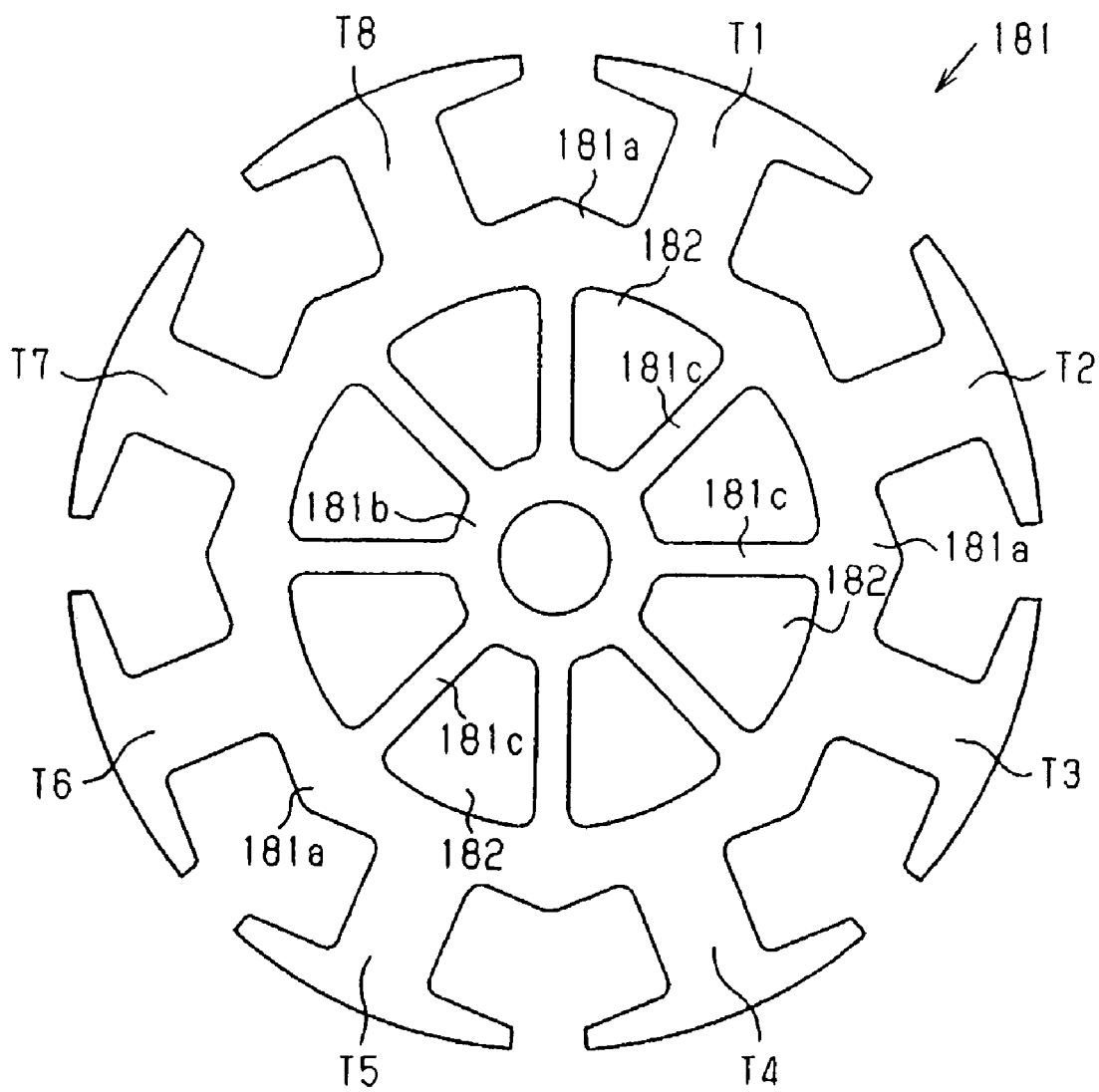
FIG. 26 is a plan view showing a core sheet of a motor of another modified embodiment of the invention.

As illustrated in FIG. 26, each of circumferential connecting portions 181a of an armature core 181 has an angular portion that projects radially outward. Each of radial connecting portions 181c extends from a portion corresponding to the angular portion of the associated circumferential connecting portion 181a to a fixing portion 181b and has uniform width, as viewed in an axial direction. Clearances 182 are arranged adjacent to the radial connecting portions 181c in the circumferential direction. In other words, each of the clearances 182 is arranged between the corresponding adjacent pair of the radial connecting portions 181c. Each of the radial connecting portions 181c is located in correspondence with the position between the corresponding adjacent pair of the teeth T1 to T8 in the circumferential direction. The clearances 182 are arranged radially inward from the teeth T1 to T8 in which heat generation concentrates.

In the first embodiment illustrated in FIG. 8, each connecting portion 116a of the commutator 108 and the corresponding mounting projection Xd are arranged with the conductor connecting portion Mb, or a portion of the coil Ma, located between the connecting portion 116a and the mounting projection Xd. The connecting portion 116a and the mounting projection Xd are electrically connected to the conductor connecting portion Mb. However, any other configuration may be selected as long as the coils M1 to M8 are electrically connected to the connecting portions 116a of the commutator 108 at the first end 11 of the armature core 107 at the side corresponding to the commutator 108.

Figure 27:
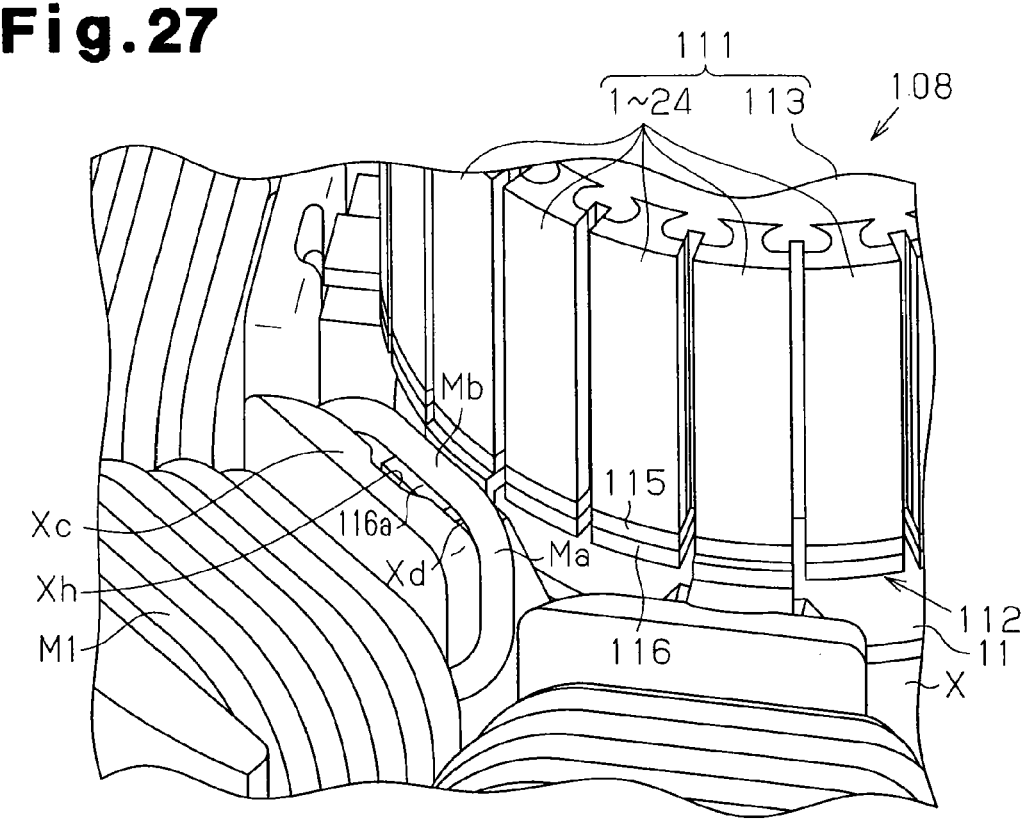
FIG. 27 is an enlarged perspective view illustrating the relative positions of a connecting portion and a conductor of another modified embodiment of the invention.

For example, as illustrated in FIG. 27, each conductor connecting portion Mb and the corresponding mounting projection Xd may be arranged with the connecting portion 116a located between the conductor connecting portion Mb and the mounting projection Xd. The conductor connecting portion Mb and the mounting projection Xd are electrically connected to the connecting portion 116a. In this case, unlike the first embodiment, the coils M1 to M8 and the connecting wires 110 must be formed by winding the conductor D around the teeth T1 to T8 after fixing the armature core 107 and the commutator 108 to the rotary shaft 106. In other words, the conductor D must be installed with the armature core 107 and the commutator 108 fixed to the rotary shaft 106.

Figure 28:
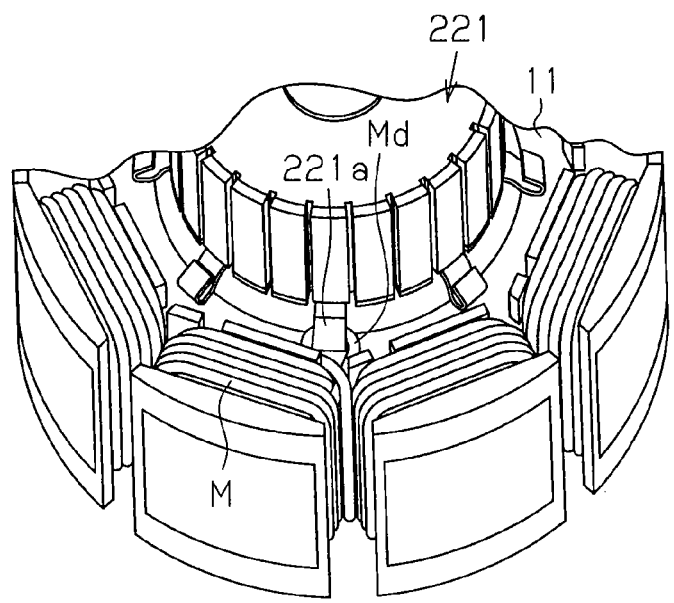
FIG. 28 is a perspective view showing a connecting portion and a conductor of another modified embodiment of the invention.

As illustrated in FIG. 28, the mounting projections Xd of the first insulator X may be omitted. For example, a conductor connecting portion Md, which passes the coil M and is connected to the connecting wire 110, is engaged by a hook-like connecting portion 221a extending from a segment of a commutator 221. This electrically connects the conductor D to the commutator 221. In FIG. 27, only one conductor connecting portion Md is shown.

Figure 29:
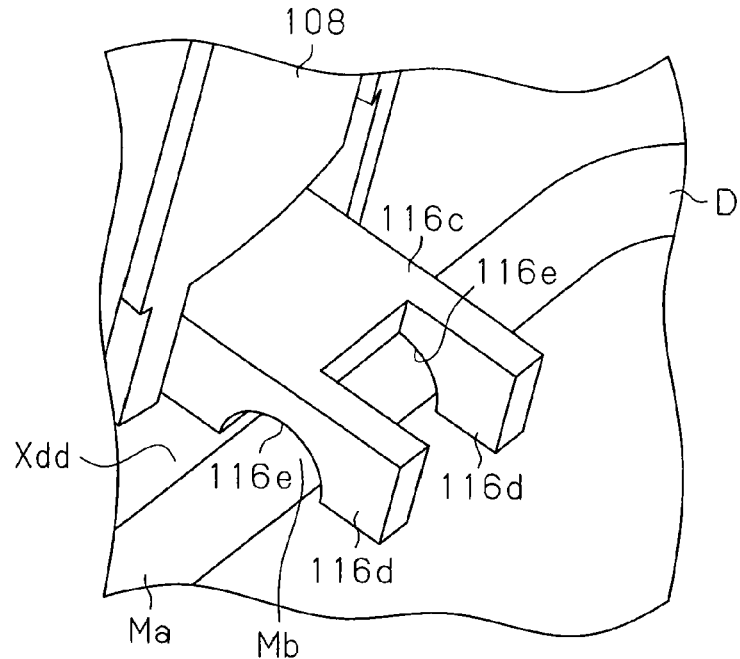
FIG. 29 is a perspective view showing a connecting portion of another modified embodiment of the invention.

Each connecting portion 116a of FIG. 16 is flexible. The connecting portion 116a is pressed against and held in contact with the conductor connecting portion Mb of the conductor D by such flexibility. However, the connecting portions are not restricted to this. That is, as illustrated in FIG. 29, a connecting portion 116c has thickness that allows compression of the conductor connecting portion Mb of the conductor D. In other words, the connecting portion 116c is sufficiently rigid for compressing the conductor D. The connecting portion 116c has a pair of extending portions 116d, which are arranged adjacently in a circumferential direction of the commutator 108. Each of the extending portions 116d is pressed against and held in contact with the conductor connecting portion Mb of the conductor D. In this case, the connecting portion 116c is connected to the conductor D at a plurality of positions. This improves reliability of electrical connection.

Each extending portion 116d of FIG. 29 has an arcuate contact portion 116e extending substantially along the outer circumferential surface of the conductor D. The contact portion 116e is pressed against and held in contact with the conductor D. Alternatively, the components may be employed in combination as needed. That is, a plurality of extending portion may be provided in a flexible connecting portion. In this case, the extending portions are pressed against and held in contact with a conductor.

Figure 30:
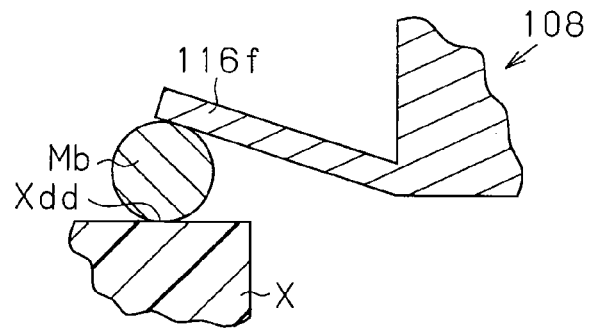
FIG. 30 is a cross-sectional view showing a connecting portion of another modified embodiment of the invention.

Each connecting portion 116a of FIG. 16 has the arcuate contact portion 116b, which extends substantially along the outer circumferential surface of the conductor D. The contact portion 116b is pressed against and held in contact with the conductor connecting portion Mb of the conductor D. However, the configuration of the connecting portion is not restricted to this. That is, as illustrated in FIG. 30, a linear connecting portion 116f may be employed. In this case, the structure of the connecting portion 116f is simplified. This facilitates manufacture of the short circuit members 112 and the commutator 108.

Figure 31:
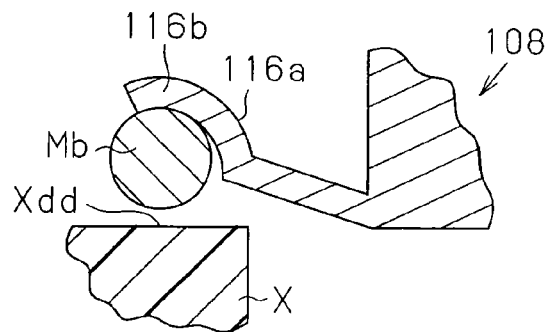
FIG. 31 is a cross-sectional view illustrating the relative positions of a connecting portion, a conductor, and a mounting portion of another modified embodiment of the invention.

Each connecting portion 116a of FIG. 16 and the corresponding mounting portion Xdd of the first insulator X are arranged with the conductor connecting portion Mb of the conductor D located between the connecting portion 116a and the mounting portion Xdd. However, the present invention is not restricted to this. That is, as illustrated in FIG. 31, the conductor connecting portion Mb of the conductor D may be separated from the mounting portion Xdd of the first insulator X. In this case, the connecting portion 116a may be pressed against and held in contact with the conductor connecting portion Mb, which is maintained in a state separated from the mounting portion Xdd. The conductor connecting portion Mb can be separated from the mounting portion Xdd by applying tension to the conductor connecting portion Mb.

The terminals Da, Db of FIGS. 19 and 20 are arranged adjacently in the radial direction. However, arrangement of the terminals Da, Db is not restricted to this but may be changed in any suitable manner, as long as the terminals Da, Db are located adjacent to each other.

Figure 33:
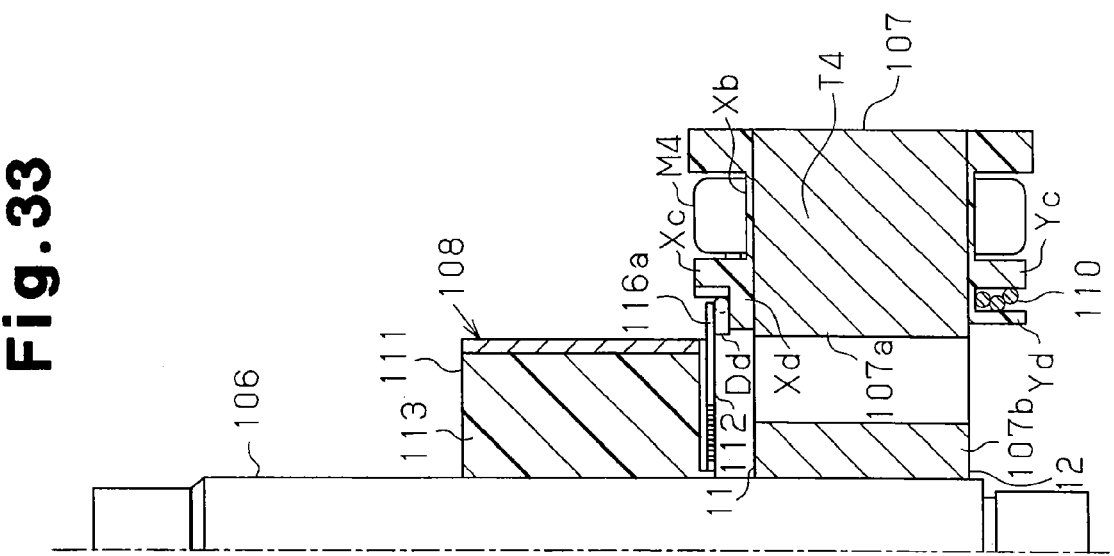
FIG. 33 is a vertical cross-sectional view showing an armature of FIG. 32.
Figure 32:
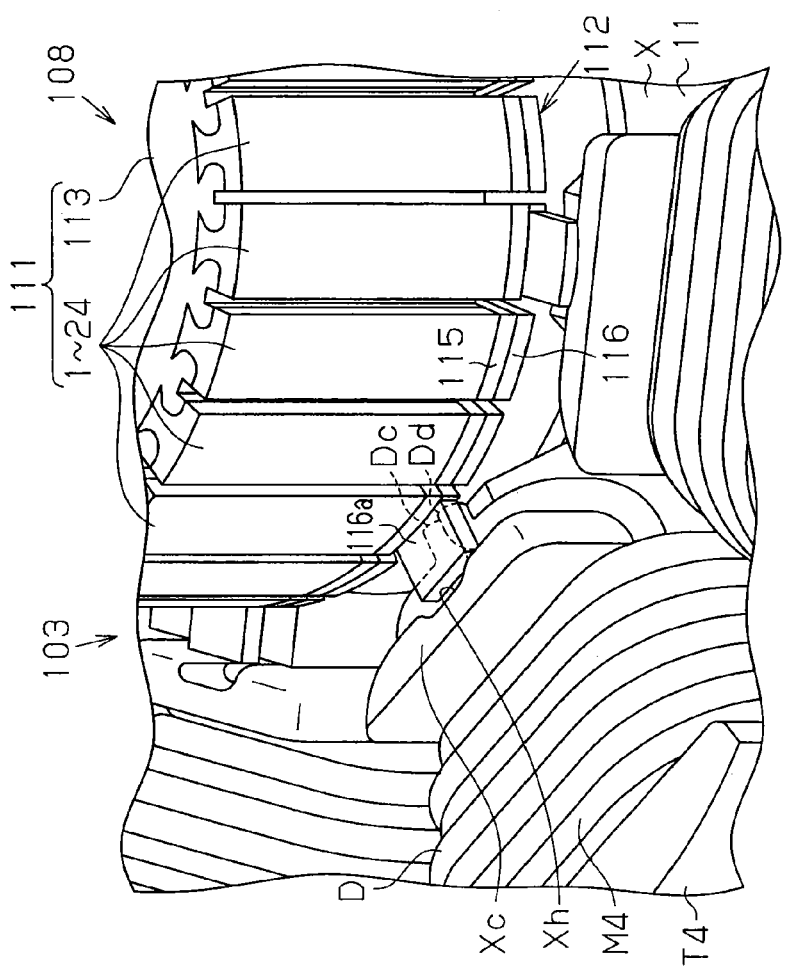
FIG. 32 is an enlarged perspective view showing a connecting portion and a conductor of another modified embodiment of the invention.

For example, as illustrated in FIGS. 32 and 33, two terminals Dc, Dd may be arranged adjacent to each other in a circumferential direction. This arrangement reduces the radial dimension of the space in which the terminals Dc, Dd are arranged, compared to the case in which the two terminals Da, Db are arranged adjacently in the radial direction. This makes it possible to decrease the radial dimension of the armature 103. In the case of FIGS. 32 and 33, the distal ends of the terminals Dc, Dd are bent radially inward and thus arranged adjacent to each other in the circumferential direction. However, the end surfaces of the terminals Dc, Dd may oppose each other without bending the distal ends of the terminals Dc, Dd.

In the illustrated embodiments, in the single connector D, the multiple coils M1 to M8 and the corresponding connecting wires 110, which interconnect the coils M1 to M8, are arranged continuously. However, the present invention is not limited to this. That is, a plurality of conductors may be prepared independently for each of the coils M1 to M8. In this case, the two terminals similar to the two terminals Da, Db are arranged in each of the teeth T1 to T8. Therefore, the multiple coils M1 to M8 are wound around the teeth T1 to T8 simultaneously.

For example, the winding start end of the coil Ma wound around the tooth T1 and the winding finish end of the coil M4 wound around the different tooth T4 correspond to the two terminals. In other words, the two terminals are formed by one of the opposing ends of a coil wound around a certain tooth and one of the opposing ends of another coil wound around a different tooth.

Each mounting projection Xd of FIG. 7 substantially has a trapezoidal shape, as viewed radially. However, as long as the mounting projection Xd axially projects with respect to the tooth cover portion Xb, the mounting projection Xd may be formed by a projection having any other suitable shape.

Each separating portion Xc of FIG. 8 has the opening Xh, which faces radially inward and is located at the position corresponding to the associated connecting portion 116a. However, the configuration of each separating portion Xc is not restricted to this but the opening Xh may be omitted from the separating portion Xc. In other words, each separating portion Xc may be shaped or configured in any other suitable manner, as long as the separating portion Xc separates the coil end Ma, or the first portion, from the second portion L.

The separating portions Xc and the mounting projections Xd are formed integrally with the first insulator X shown in FIG. 5. However, the separating portions Xc and the mounting projections Xd may be provided separately from the first insulator X.

In the embodiment shown in FIG. 8, each coil end Ma, which is the final turn of the winding of the corresponding coil M1 to M8, is located radially inward from the separating portion Xc. The second portion L, except for the coil end Ma, is wound around the corresponding tooth T1 to T8 at a position radially outward from the separating portion Xc. Each conductor connecting portion Mb, or a portion of the coil end Ma, is arranged on the corresponding mounting projection Xd. However, each coil end Ma may be the first turn of the winding of the corresponding coil M1 to M8. A portion of the first turn of winding may be mounted on the corresponding mounting projection Xd as a conductor connecting portion.

Each short circuit member 112 of FIG. 3 may be configured in any suitable manner as long as the short circuit member 112 electrically connects prescribed segments together.

Each connecting portion 116a of the commutator 108 shown in FIG. 2 is formed in the corresponding short circuit member 112, or, specifically, the corresponding second short circuit piece 116. However, the present invention is not restricted to this. That is, as long as the connecting portion 116a extends from a segment of the commutator, the connecting portion 116a may be formed in any suitable manner, or, for example, integrally with a segment of the commutator body 111. Also, the connecting portion 116a does not necessarily have to project radially outward from a segment but may project axially.

Referring to FIG. 9, the grooves Xg, Yg are defined between each adjacent pair of the teeth T1 to T8 in the circumferential direction. Each of the grooves Xg, Yg faces radially outward and extends axially. As illustrated in FIG. 9, each relay portion Mc is provided in the groove Xg, Yg. However, the shape or the number of the grooves Xg, Yg may be altered as needed. The grooves Xg, Yg do not necessarily have to be defined in the first and second insulators X, Y but may be provided directly in the armature core 107. Alternatively, the grooves Xg, Yg may be omitted.

With reference to FIG. 2, the guide portion formed by the outer wall Yc and the inner wall Yd is provided at the side of the armature core 107 closer to the second end 12. The guide portion circumferentially guides the connecting wires 110 at positions radially inward from the teeth T1 to T8. However, the outer wall Yc and the inner wall Yd may be shaped in different manners. Further, the outer wall Yc and the inner wall Yd do not necessarily have to be formed integrally with the second insulator Y but may be provided separately from the second insulator Y. Alternatively, the outer wall Yc and the inner wall Yd may be omitted.

For example, each coil end Ma of the conductor D shown in FIG. 21 is electrically connected to the corresponding connection terminal 332 through laser welding, or a type of non-contact welding. However, the present invention is not restricted to this. That is, the coil end Ma may be electrically connected to the connection terminal 332 through other types of non-contact welding such as arc welding or electron beam welding. Alternatively, contact welding involving use of jigs such as a pair of electrodes, which are held in contact with the coil ends Ma and the connection terminals 332, may be employed.

In FIG. 21, the present invention is embodied by the brushless motor 311 incorporated in the electric fan device 301 for cooling an engine. However, the invention may be applied to brushless motors incorporated in other suitable devices.

Figure 34:
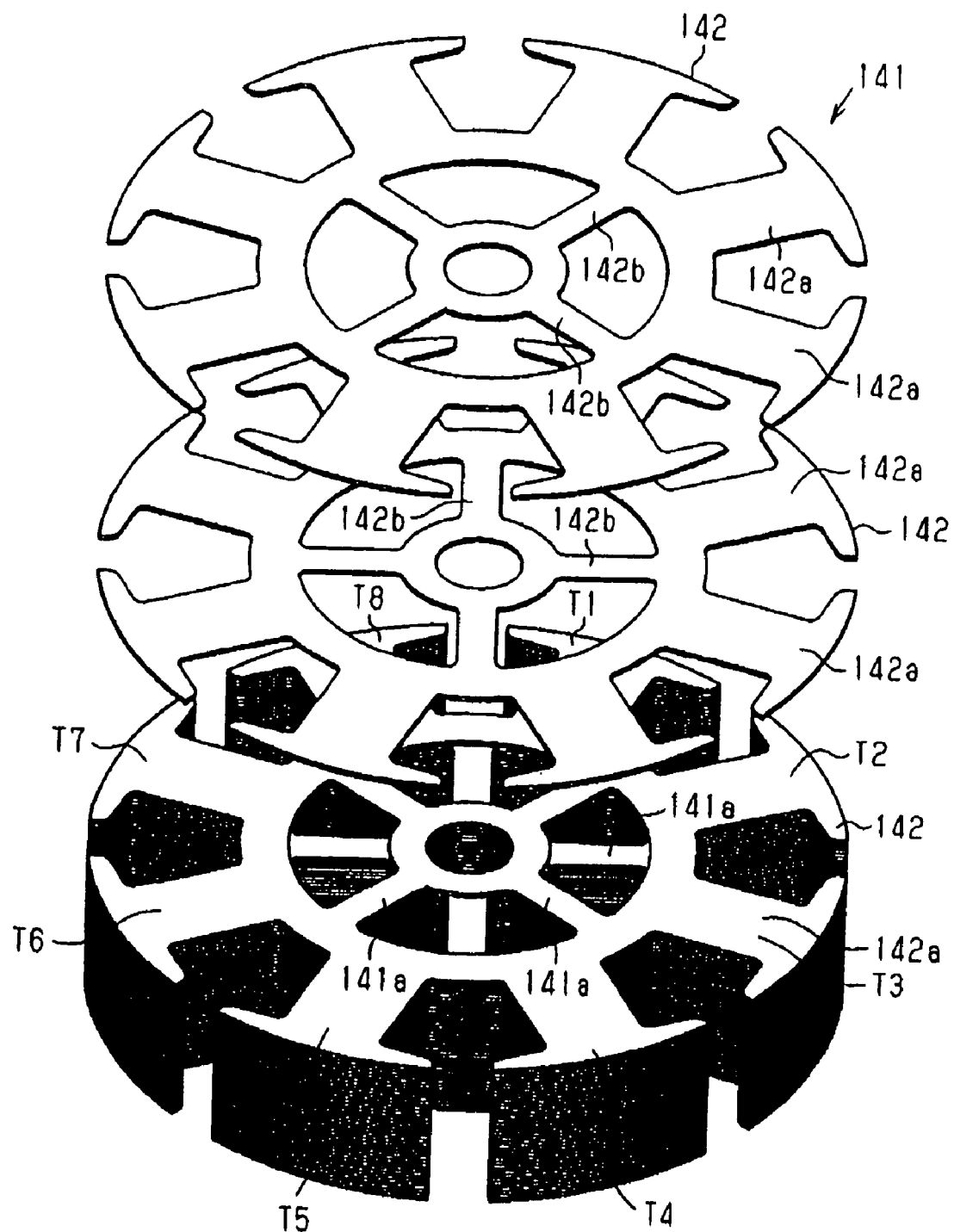
FIG. 34 is an exploded perspective view showing the layered structure of a core sheet of another modified embodiment of the invention.

In FIG. 24, each core sheet 121 includes eight tooth forming portions 121a and the same number of, or eight, radial portions 121b. However, the numbers of these components are not restricted to this. For example, as in the modified embodiment shown in FIG. 34, an armature core 141 may be formed by stacking n core sheets 142 together. In FIG. 34, the number n is an even number and satisfies the equation: n=40. Each of the core sheets 142 has m tooth forming portions 142a, which are spaced at equal angular intervals, and (m/2) radial portions 142b, which are also spaced at equal angular intervals. In FIG. 34, the number m is an even number and satisfies the equation: m=8.

Referring to FIG. 34, the teeth T1 to T8 are formed by stacking the tooth forming portions 142a by the number corresponding to the n (n=40) core sheets 142 together. The radial portions 142b are mutually separated in a circumferential direction at the angle between each adjacent pair of the teeth T1 to T8, or, specifically, 45 degrees. The (n/2), or 20, radial portions 142b are stacked together in an axial direction, thus forming the corresponding radial connecting portion 141a. The core sheet 142 of FIG. 34 is substantially shaped by omitting every other one of the radial portions 121b of the core sheet 121 of FIG. 24 in a circumferential direction. The positions of the radial portions 142b are circumferentially offset in alternating ones of the core sheets 142.

In FIG. 34, two of the core sheets 142 are illustrated as separated from the armature core 141, for the illustrative purposes. The reference numeral "141" refers to an armature core in a state in which all of the core sheets 142 are stacked together.

In the case of FIG. 34, the weight of the armature core 141 is reduced while the teeth T1 to T8 are supported in a well-balanced manner. The radial portions 142b are provided circumferentially offset in alternating ones of the core sheets 142. This defines a clearance in each of the axial opposing sides of each radial portion 142b. In other words, clearances are defined by the radial connecting portions 141a of the alternating ones of the core sheets 142, extending circumferentially. The heat radiating performance of the armature core 141 is further improved.

Figure 35:
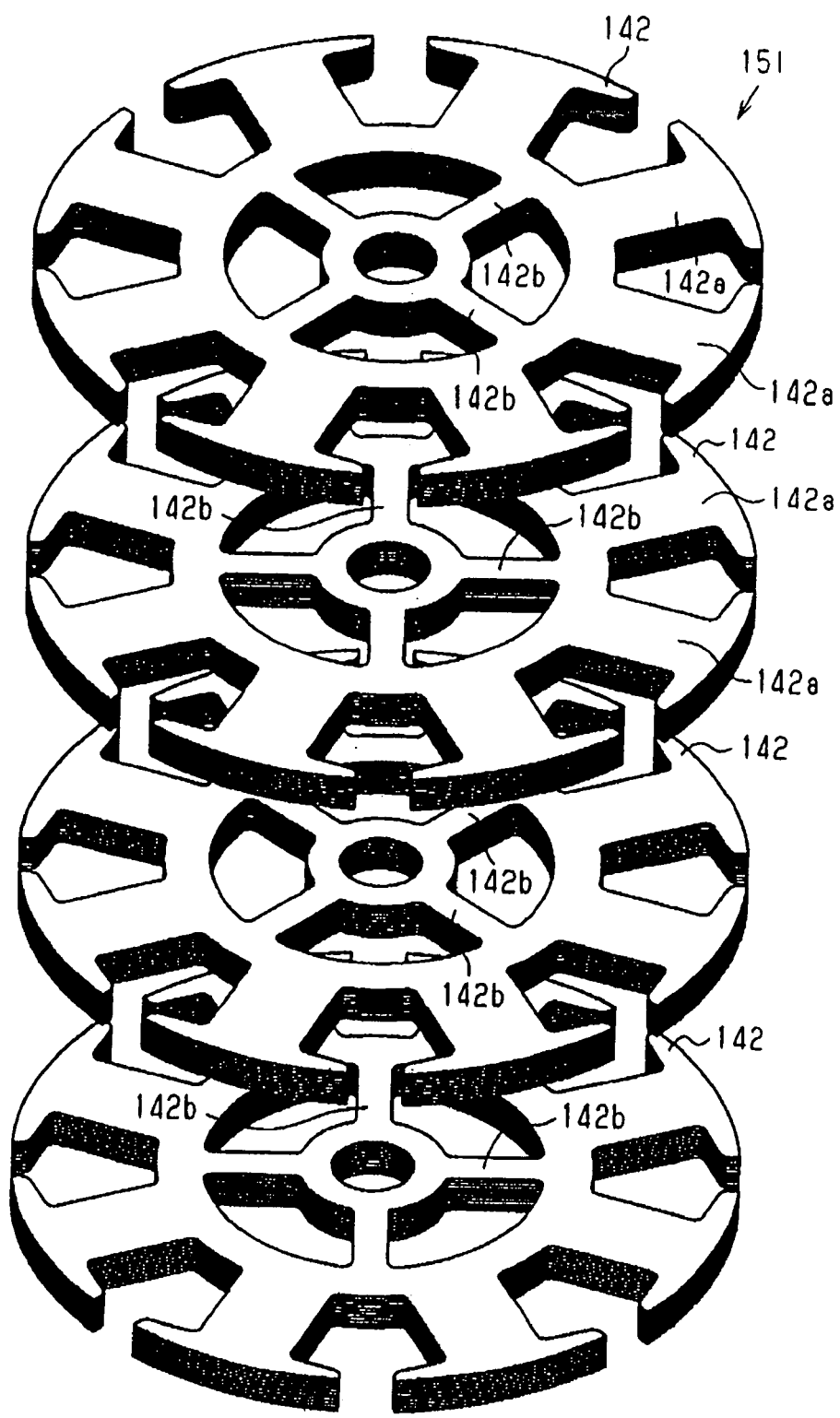
FIG. 35 is an exploded perspective view showing the layered structure of a core sheet of another modified embodiment of the invention.

For example, the illustrated embodiments may be modified to an armature core 151, which is shown in FIG. 35. In the armature core 151, the radial portions 142b of ten consecutive ones of the core sheets 142 are located circumferentially offset from the radial portions 142b of adjacent ten consecutive ones of the core sheets 142.

Figure 36:
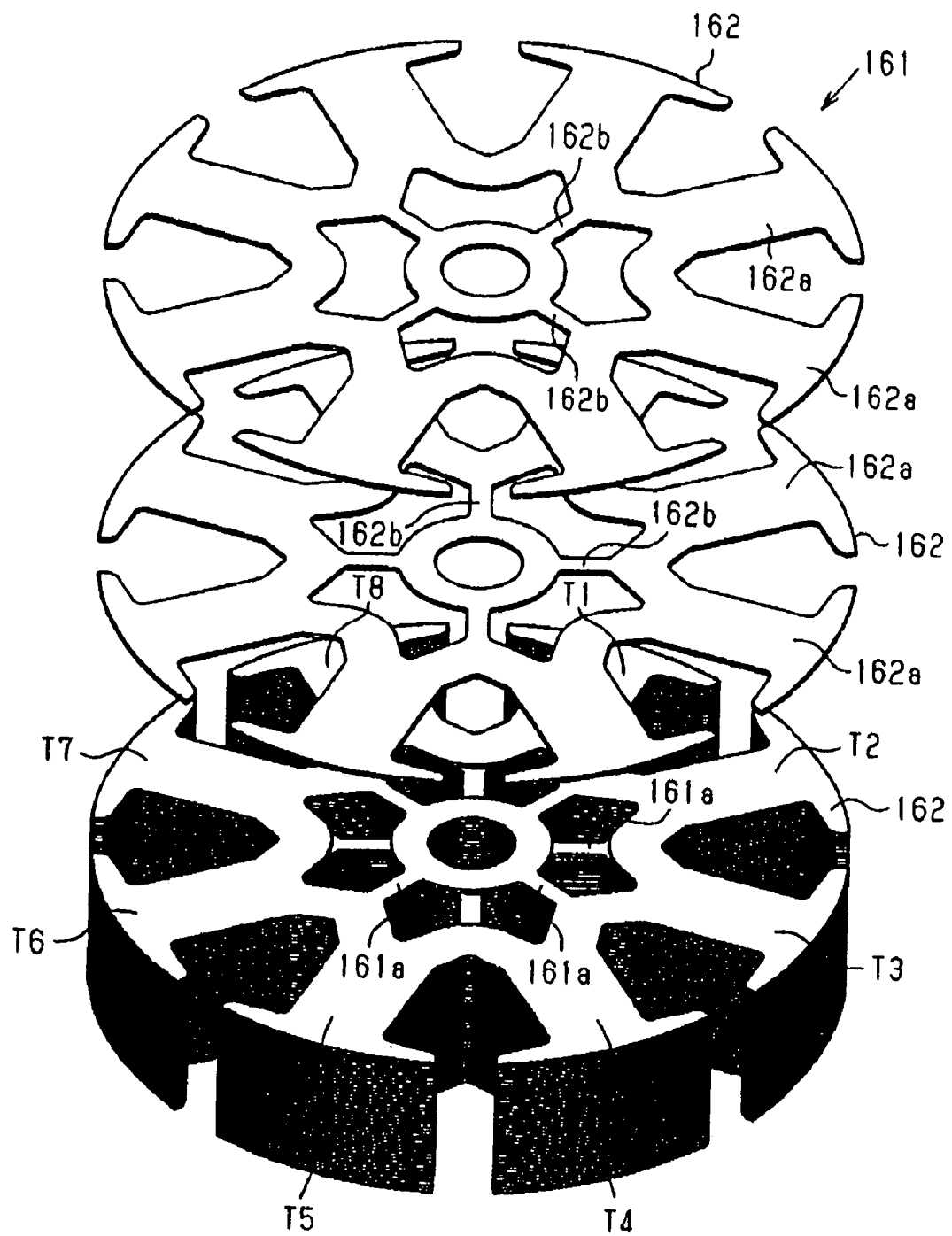
FIG. 36 is an exploded perspective view showing the layered structure of a core sheet of another modified embodiment of the invention.

Further, for example, as in the modified embodiment shown in FIG. 36, an armature core 161 includes n core sheets 162, which are stacked together. The number n is an even number and satisfies the equation: n=40 in FIG. 36 Each of the core sheets 162 has m tooth forming portions 162a, which are spaced at equal angular intervals, and (m/2) radial portions 162b, which are also spaced at equal angular intervals. The number m is an even number and satisfies, for example, the equation: m=8. The teeth T1 to T8 are formed by stacking the tooth forming portions 162a of the n, or 40, core sheets 162 together.

The radial portions 162b are mutually separated in a circumferential direction at the angle between each adjacent pair of the teeth T1 to T8, or, specifically, 45 degrees. The (n/2), or twenty, radial portions 162b are stacked together in an axial direction, thus forming the corresponding radial connecting portion 161a.

The core sheet 162 of FIG. 36 is substantially shaped by omitting every other one of the radial portions, which form the radial connecting portions 131c, of the core sheet of FIG. 25 in a circumferential direction. The positions of the radial portions 162b of the core sheets 162 are located circumferentially offset in alternating ones of the core sheets 162.

By the core sheets 162 of FIG. 36, the weight of the armature core 161 is reduced while the teeth T1 to T8 are supported in a well-balanced manner. The radial portions 162b are provided circumferentially offset in alternating ones of the core sheets 162. This defines a clearance in each of the axial opposing sides of each radial portion 162b. In other words, clearances are defined by the radial connecting portions 161a of the alternating ones of the core sheets 162 and extend circumferentially. The heat radiating performance of the armature core 161 is further improved.

Figure 37:
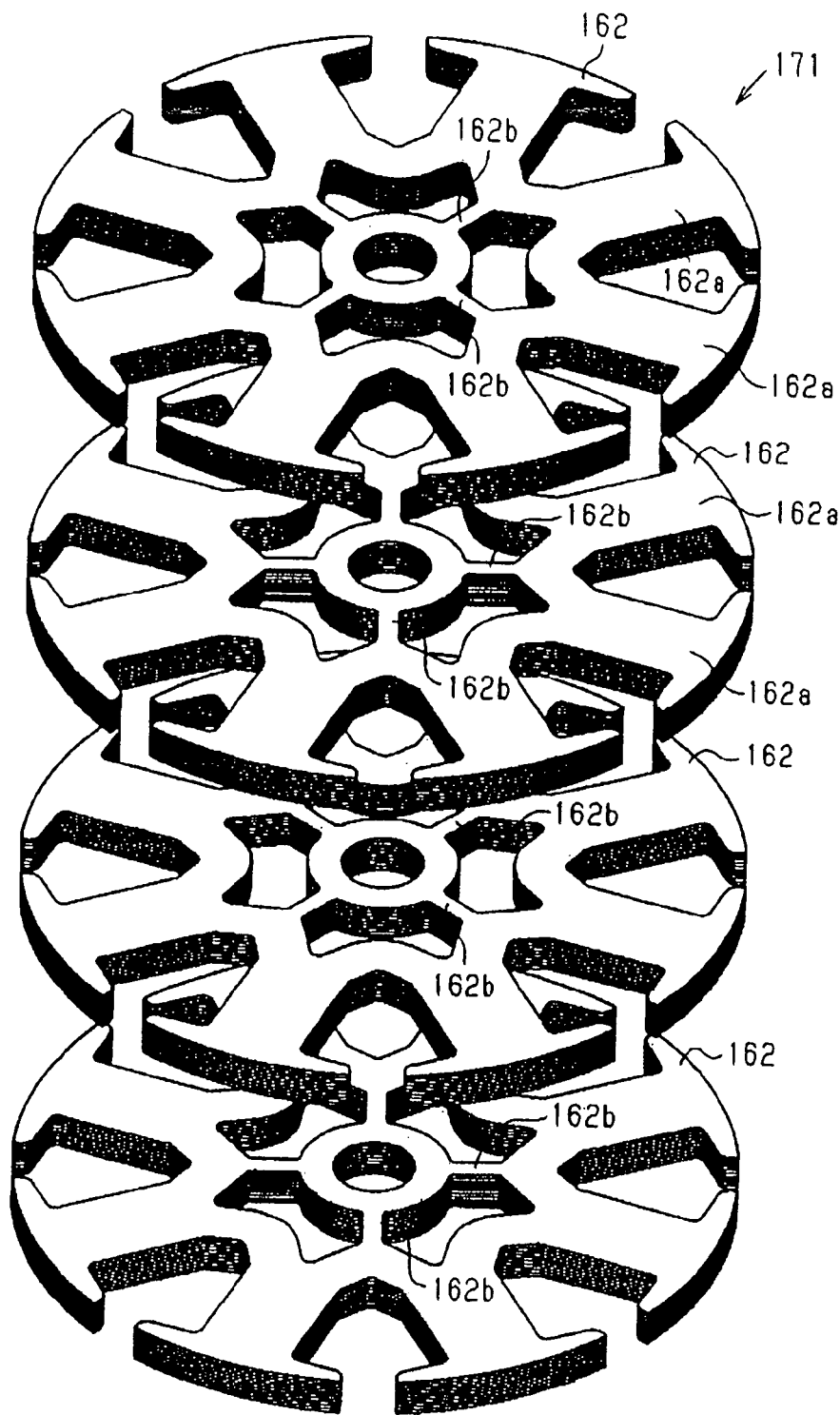
FIG. 37 is an exploded perspective view showing the layered structure of a core sheet of another modified embodiment of the invention.

Alternatively, for example, the illustrated embodiments may be modified to an armature core 171, which is shown in FIG. 37. In the armature core 171, the radial portions 162b, which are shown in FIG. 36, of ten consecutive ones of the core sheets 162 are located circumferentially offset from the radial portions 162b of adjacent ten consecutive ones of the core sheets 162.

In each of the illustrated embodiments, the armature core 107 is formed by stacking the core sheets having the identical shapes together. However, the present invention is not restricted to this. The armature core 107 may be formed by stacking core sheets having different shapes together. For example, core sheets from which the fixing portions 107b and the radial connecting portions 107c are omitted may be stacked together at the first end 11 and the second end 12 of the armature core 107. That is, the core sheets provided at the first end 11 and the second end 12 include only the teeth T1 to T8 and the circumferential connecting portions 107a. The armature core has a cylindrical opening defined in the center of the first end 11 and the second end 12. Therefore, by accommodating a portion of the commutator 108 in the opening, the size of the DC motor 101 is reduced.

The short circuit members 112 of the commutator 108 electrically connect the twenty-four segments 1 to 24 at the intervals of 120 degrees. However, the present invention is not restricted to this. The segments 1 to 24 may be electrically connected together at the intervals of 120 degrees by cables extending continuously from the coils M1 to M8, or connecting wires.

In the illustrated embodiments, the DC motor has six magnets 105, eight slots S1 to S8, and twenty-four segments 24. However, the numbers of these components may be altered. For example, the DC motor may include eight magnets, nine slots, and thirty-six segments. Alternatively, the DC motor may include ten magnets, twelve slots, and sixty segments.

The invention claimed is:

1. An armature comprising:
   an armature core having a plurality of radial teeth;
   an insulator mounted in the armature core;
   a conductor including a plurality of coils extending continuously, wherein each of the coils is wound around one of the teeth of the armature core by way of concentrated winding with the insulator mounted in the armature core;
   a power feeding member supplying a current from a power source to the coils, wherein the power feeding member has a connecting portion; and
   a plurality of separating portions provided in the insulator, wherein the separating portions are arranged in the teeth and separate each of the coils into a first portion and a second portion, the first portion and the second portion being aligned in a radial direction in each of the coils, and wherein the connecting portion is electrically connected to the first portion.

2. The armature according to claim 1, wherein the conductor includes a connecting wire that interconnects the coils.

3. The armature according to claim 2, wherein the connecting wire is arranged in such a manner as to avoid the first portions.

4. The armature according to claim 2,
   wherein the armature core has a first end provided at a side corresponding to the power feeding member and a second end arranged at an opposing side as viewed in an axial direction,
   wherein the first portions are electrically connected to the connecting portion at a side corresponding to the first end, and
   wherein the connecting wire is arranged at a side corresponding to the second end.

5. The armature according to claim 1,
   wherein the armature is a rotor of a DC motor, and
   wherein the power feeding member is a commutator that includes a plurality of segments, the connecting portion extending from at least one of the segments.

6. The armature according to claim 1,
   wherein the armature is a stator of a brushless motor,
   wherein the armature core is a stator core, and
   wherein the power feeding member is a circuit device secured to the stator core, the connecting portion extending from the circuit device.

7. The armature according to claim 1, further comprising a mounting portion in which the first portions are arranged, the mounting portion being located radially inward from the separating portion,
   wherein the insulator has tooth cover portions each covering one of the teeth, and
   wherein the mounting portion projects in an axial direction of the armature compared to the tooth cover portions.

8. The armature according to claim 7, wherein the mounting portion has a substantially trapezoidal shape as viewed in a radial direction.

9. The armature according to claim 1, wherein the separating portion has an opening in correspondence with the connecting portion, the opening being faced radially inward.

10. The armature according to claim 1, wherein the first portion and the connecting portion are arranged in an overlapped manner in the axial direction of the armature.

11. The armature according to claim 10, further comprising a portion in which the first portions are arranged, wherein the portion and the connecting portion are located in such a manner that the first portions are provided between the portion and the connecting portion.

12. The armature according to claim 1, wherein the separating portion is one of a plurality of separating portions, each of the separating portions corresponding to one of the teeth.

13. The armature according to claim 1, wherein the connecting portion is electrically connected to the conductor in a state held in contact with the conductor to apply a pressing force to the conductor.

14. The armature according to claim 13, wherein the connecting portion is flexible and contacts the conductor in a state flexed to apply a pressing force to the conductor.

15. The armature according to claim 13, wherein the connecting portion is electrically connected to a coil end, the coil end being a winding start portion or a winding end portion of each of the coils.

16. The armature according to claim 13,
wherein the insulator is formed of resin, and
wherein the connecting portion and the insulator are arranged in such a manner that the conductor is provided between the connecting portion and the insulator.

17. The armature according to claim 13,
wherein the connecting portion has an arcuate contact portion extending substantially along an outer circumferential surface of the conductor, and
wherein the contact portion contacts the conductor to apply a pressing force to the conductor.

18. The armature according to claim 1, wherein the power feeding member is connected to the conductor through laser welding.

19. The armature (103, 313) according to claim 1,
wherein the conductor includes two terminals that are electrically connected to each other, the terminals being arranged adjacent to each other, each of the terminals being arranged radially inward from the separating portion as the first portion, each terminal being held in contact with and electrically connected to the connecting portion.

20. The armature (103, 313) according to claim 19, wherein the two terminals are arranged adjacently in a radial direction of the armature core.

21. The armature according to claim 19, wherein the two terminals are arranged adjacently in a circumferential direction of the armature core.

22. The armature according to claim 19, wherein the conductor includes a connecting wire that interconnects multiple ones of the coils continuously.

23. The armature according to claim 22, wherein the two terminals are arranged in one of the teeth, the first portions of the coils wound around the other ones of the teeth, in which the two terminals are not arranged, being located radially inward from the separating portion and held in contact with and electrically connected to the connecting portion.

24. The armature according to claim 22, wherein all of the coils of the armature are formed by the single conductor.

25. The armature according to claim 22,
wherein the coils include at least a first coil and a second coil, all of the coils being formed by a plurality of conductors; and
wherein if one of a winding start portion and a final turn of the winding of each of the coils is defined as a first turn portion and the other is defined as a second turn portion, the two terminals are formed by the first turn portion of the first coil and the second turn portion of the second coil.

26. A rotating electrical machine having a rotary shaft to which the armature core according to claim 1 is fixed, wherein the armature core further includes:
a circumferential connecting portion that circumferentially connects distal ends of multiple ones of the teeth;
an annular fixing portion in which the rotary shaft is fitted; and
a radial connecting portion that extends in a radial direction of the armature core for connecting a circumferential portion of the circumferential connecting portion to the fixing portion, the radial connecting portion being arranged between adjacent ones of the teeth in a circumferential direction.

27. The rotating electrical machine according to claim 26, wherein the armature core is formed by stacking a plurality of core sheets having identical shapes together.

28. The rotating electrical machine according to claim 27,
wherein the armature core is formed by stacking n core sheets together,
wherein each of the core sheets includes m tooth forming portions that are spaced at equal angular intervals and (m/2) radial portions that are spaced at equal angular intervals,
wherein each of the teeth is formed by stacking the tooth forming portions by the number corresponding to n, and
wherein the radial portions of the (n/2) core sheets are located circumferentially offset from the radial portions of the other core sheets by an angle of (360°/m), each radial connecting portion being formed by axially stacking the radial portions by the number corresponding to (n/2) together.

29. The rotating electrical machine according to claim 28, wherein the radial portions of each core sheet are circumferentially offset from the radial portions of the adjacent the core sheet.

30. The rotating electrical machine according to claim 26, wherein the radial connecting portion forms a portion of a magnetic path of a magnetic flux flowing between circumferentially adjacent ones of the teeth.

31. A DC motor comprising:
a rotor formed by the armature according to claim 1; and
a stator,
wherein the power feeding member is a commutator; and
wherein the stator has a power feeding brush that is pressed against and held in contact with the commutator and a plurality of magnets that are arranged in such a manner as to encompass the armature core.

32. A brushless motor comprising:
a stator formed by the armature according to claim 1; and
a rotor,
wherein the armature core forms a stator core, the power feeding member being formed by a circuit device that is secured integrally to the stator core.

* * * * *